(12) United States Patent
Barhai et al.

(10) Patent No.: US 12,364,189 B2
(45) Date of Patent: Jul. 22, 2025

(54) ARTIFICIAL INTELLIGENCE (AI) BASED SYSTEM AND METHOD FOR MANAGING NUTRIENT CONCENTRATE IN WATER-BASED SOLUTIONS

(71) Applicant: Envonics LLC, North Miami, FL (US)

(72) Inventors: Lior Barhai, North Miami, FL (US); Kumar Nikkhil Raj Agrawal, North Miami, FL (US)

(73) Assignees: Lior Barhai Agrawal, North Miami, FL (US); Kumar Nikkhil Raj Agrawal, North Miami, FL (US)

( * ) Notice: Subject to any disclaimer, the term of this patent is extended or adjusted under 35 U.S.C. 154(b) by 793 days.

(21) Appl. No.: 17/700,565

(22) Filed: Mar. 22, 2022

(65) Prior Publication Data

US 2022/0295691 A1    Sep. 22, 2022

Related U.S. Application Data

(60) Provisional application No. 63/163,962, filed on Mar. 22, 2021.

(51) Int. Cl.
*A01C 21/00* (2006.01)
*C05G 1/00* (2006.01)
(Continued)

(52) U.S. Cl.
CPC .............. *A01C 21/007* (2013.01); *C05G 1/00* (2013.01); *C05G 5/23* (2020.02); *G06N 3/08* (2013.01)

(58) Field of Classification Search
CPC ...................................................... C05G 5/02
See application file for complete search history.

(56) References Cited

U.S. PATENT DOCUMENTS

| 10,119,927 | B2 | 11/2018 | Naidu et al. |
| 2018/0049364 | A1* | 2/2018 | Campisi-Pinto ..... A01C 21/007 |

(Continued)

FOREIGN PATENT DOCUMENTS

| CN | 102175737 A | 9/2011 |
| CN | 204630977 U | 9/2015 |

(Continued)

OTHER PUBLICATIONS

Real-time Nutrient Monitoring of Hydroponic Solutions Using a Ion-selective Electrode-based Embedded System; Hee-Jo Han, Hak-Jin Kim, Dae-Hyun Jung, Woo-Jae Cho, Yeong-Yeol Cho and Gong-In Lee; Protected Horticulture and Plant Factory, vol. 29, No. 2:141-152, Apr. 2020; https://doi.org/10.12791/KSBEC.2020.29.2.141.

*Primary Examiner* — Paul B Yanchus, III
(74) *Attorney, Agent, or Firm* — Jason C. Cameron

(57) ABSTRACT

A system and method for managing nutrient concentrate in water-based solutions is disclosed. The method includes receiving nutrient information of water-based solution from a data measurement unit at real-time and receiving a set of desired parameters associated with the crops from one or more sources. The method further generating a set of nutrients recommendations corresponding to one or more additional nutrients required in the water-based solution for maximum crop yield and determining a set of dosing parameters to inject the one or more additional nutrients in the water-based solution based on the nutrient information, the set of desired parameters and the set of nutrients recommendations by using a nutrient management based AI model. Further, the method includes the nutrient information, the set of desired parameters, the set of nutrients recommendation and the set of dosing parameters on user interface screen of one or more electronic devices.

20 Claims, 10 Drawing Sheets

(51) Int. Cl.
*C05G 5/23* (2020.01)
*G06N 3/08* (2023.01)

(56) References Cited

U.S. PATENT DOCUMENTS

2022/0015287 A1* 1/2022 Kramarenko ........ A01C 23/042
2022/0253757 A1* 8/2022 Harkiewicz ............ G06Q 10/04

FOREIGN PATENT DOCUMENTS

| CN | 103499984 B | 9/2016 |
| CN | 106370710 A | 2/2017 |

* cited by examiner

ARTIFICIAL INTELLIGENCE (AI) BASED SYSTEM AND METHOD FOR MANAGING NUTRIENT CONCENTRATE IN WATER-BASED SOLUTIONS

EARLIEST PRIORITY DATE

This application claims priority from a Provisional patent application filed in the United States of America having Patent Application No. 63/163,962, filed on Mar. 22, 2021, and titled "SYSTEM AND METHOD FOR REAL-TIME NUTRIENT CONCENTRATE MONITORING IN WATER-BASED SOLUTIONS".

FIELD OF INVENTION

Embodiments of the present disclosure relate to nutrient concentrate monitoring in water-based solutions and more particularly relates to an Artificial Intelligence (AI) based system and method for managing nutrient concentrate in water-based solutions.

BACKGROUND

The process of integrating fertilizer into water to irrigate agricultural fields is called fertigation. The fertigation process combines irrigation with fertilization. A water-fertilizer integral mixture is made by pressure systems dissolving solid or liquid fertilizer in the water. It is mandated to mix a specific amount of fertilizer in water based on crop-specific needs to support the growth of crops and earn higher productivity from agricultural fields. Therefore, monitoring the level of nutrients being supplied to crops in the process of fertigation is essential to improve fertilization efforts.

The global population is projected to reach 10 billion by 2050. Combined with a steady global trend for economic growth, this means that demand for food will continue to grow dramatically. Further, Food and Agriculture (FAO) organization projects that is feeding the world's population 2050 may require to raise overall food production by about 70% using only 5% more land. At the same time, to curb the effects of climate change, the world urgently needs to cut greenhouse gas emissions from agriculture production and stop conversion of remaining forests to agriculture land. Further, fresh water use in agriculture further adds to challenge of sustainable food production as agriculture accounts for about 70% of global freshwater use. To maintain adequate global levels of fresh water supply, the world needs to meet the food requirements of a growing population without dramatically increasing the amount of freshwater in agriculture.

Controlled Environment Agriculture (CEA) is an advanced and intensive form of agriculture where crops are grown in controlled environment under optimized horticulture practices. Further, wide adoption of CEA is poised to improve access to affordable, high-quality produce, refining local food systems and supporting food security sustainably. Further, CEA farms use many new and evolving horticultural technologies such as hydroponics, aeroponics, and aquaculture which are based on nutrient-mix water systems. Hydroponics is a type of horticulture and a subset of hydroculture, which is a method of growing plants without soil by using mineral nutrient solutions in an aqueous solvent. The hydroponics offer many potential advantages such as water use efficiency, seasonal and geographic independence, and higher yields. To enable efficient CEA systems on a practical scale, there is a critical need to monitor nutrient concentrations in real-time and guide automated replenishment of nutrient solution. Further, aeroponics is the process of growing plants in an air or mist environment without the use of soil or an aggregate medium. Further, aquaculture is a technique of farming in water, i.e. —breeding, raising, and harvesting fish, shellfish, and aquatic plants in freshwater or in saltwater under controlled conditions. Monitoring of nutrient levels in water in such processes is crucial to ensure efficient functioning of the systems to obtain larger produce volumes, higher-quality produce, and reduce nutrient inputs/costs. Therefore, monitoring the nutrient concentrate levels in such water systems and processes in real-time is essential to improve results.

In one of the existing arts of estimating nutrient concentrate levels, the farmer/grower measures the quantity of salts present in the solution by using the process of electrical conductivity and potential of Hydrogen (pH). However, the process provides a measure of overall amounts of salts but does not give any information on the levels of individual nutrients present in the solution. Further, any type of ion present in the solution, such as sodium contamination accumulated from water sources, may deviate/influence EC readings. Furthermore, any Deviations from optimal nutrient content may lead to deficiency and toxicity, reducing yields and increasing costs. To avoid this, growers purge their nutrient reservoirs regularly, wasting water and nutrients. Further, in other existing arts, information on the levels of individual nutrient levels is obtained by sending a sample of solution to a laboratory for a nutrient analysis. This alternative is very costly and requires a significant amount of time (e.g., five to ten days) and is not an analysis that can be acted upon immediately. Further, Ion-Selective Electrodes (ISEs) may also be used for nutrient management in hydroponics. However, there are multiple technical ussies which continue to deter wide adoption of ISEs, such as effect of interfering ions, ionic strength, temperature and drift in output signals. Thus, there exists a lack of a technique for nutrient analysis in real-time which is low-cost, portable, and can provide real-time deep insights about all the primary nutrients, secondary nutrients, and micro-nutrients in water systems.

Hence, there is a need for an improved system and method for managing nutrient concentrate in water-based solutions, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an Artificial Intelligence (AI) based computing system for managing nutrient concentrate in water-based solutions is disclosed. The AI based computing system includes one or more hardware processors and a memory coupled to the one or more hardware processors. The memory includes a plurality of modules in the form of programmable instructions executable by the one or more hardware processors. The plurality of modules include a data receiver module configured to receive nutrient information of water-based solution to be fed to crops from a data measurement unit at real-time. The nutrient information include nutrient concentrations, potential of Hydrogen (pH) and one or more contaminants. The nutrition concentrations comprise amount of one or more ions corresponding to at least one of: a set of primary nutrients, a set of secondary nutrients and a set of micro-nutrients. The data receiver module is also configured to receive a set of desired parameters associated with the crops from one or more sources. The one or more sources include at least one of: a plurality of Internet of Things (IoT) sensors and a set of inputs from one or more users. The set of desired parameters include: one or more environment parameters, one or more light parameters, nutrient concentration, growth conditions of the crops, crop varieties and developmental stage of the crops. The plurality of modules also include a recommendation generation module configured to generate a set of nutrients recommendations corresponding to one or more additional nutrients required in the water-based solution for maximum crop yield based on the received nutrient information, the received set of desired parameters, a predefined nutrient information and historical crop data associated with the crops by using a nutrient management based AI model. The plurality of modules includes a parameter determination module configured to determine a set of dosing parameters to inject the one or more additional nutrients in the water-based solution via a dosing unit based on the received nutrient information, the received set of desired parameters and the generated set of nutrients recommendations by using the nutrient management based AI model. The dosing unit injects the one or more additional nutrients in the water-based solution based on the determined set of dosing parameters. Further, the plurality of modules include a data output module configured to output the received nutrient information, the received set of desired parameters, the generated set of nutrients recommendation and the determined set of dosing parameters on user interface screen of one or more electronic devices associated with the one or more users.

In accordance with another embodiment of the present disclosure, an Artificial Intelligence (AI) based method for managing nutrient concentrate in water-based solutions is disclosed. The AI based method includes receiving nutrient information of water-based solution to be fed to crops from a data measurement unit at real-time. The nutrient information includes nutrient concentrations, potential of Hydrogen (pH) and one or more contaminants. The nutrition concentrations comprises amount of one or more ions corresponding to at least one of: a set of primary nutrients, a set of secondary nutrients and a set of micro-nutrients. The AI based method also includes receiving a set of desired parameters associated with the crops from one or more sources. The one or more sources include at least one of: a plurality of Internet of Things (IoT) sensors and a set of inputs from one or more users. The set of desired parameters include: one or more environment parameters, one or more light parameters, nutrient concentration, growth conditions of the crops, crop varieties and developmental stage of the crops. The AI based method further includes generating a set of nutrients recommendations corresponding to one or more additional nutrients required in the water-based solution for maximum crop yield based on the received nutrient information, the received set of desired parameters, a predefined nutrient information and historical crop data associated with the crops by using a nutrient management based AI model. Further, the AI based method includes determining a set of dosing parameters to inject the one or more additional nutrients in the water-based solution via a dosing unit based on the received nutrient information, the received set of desired parameters and the generated set of nutrients recommendations by using the nutrient management based AI model. The dosing unit injects the one or more additional nutrients in the water-based solution based on the determined set of dosing parameters. Also, the AI based method includes outputting the received nutrient information, the received set of desired parameters, the generated set of nutrients recommendation and the determined set of dosing parameters on user interface screen of one or more electronic devices associated with the one or more users.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
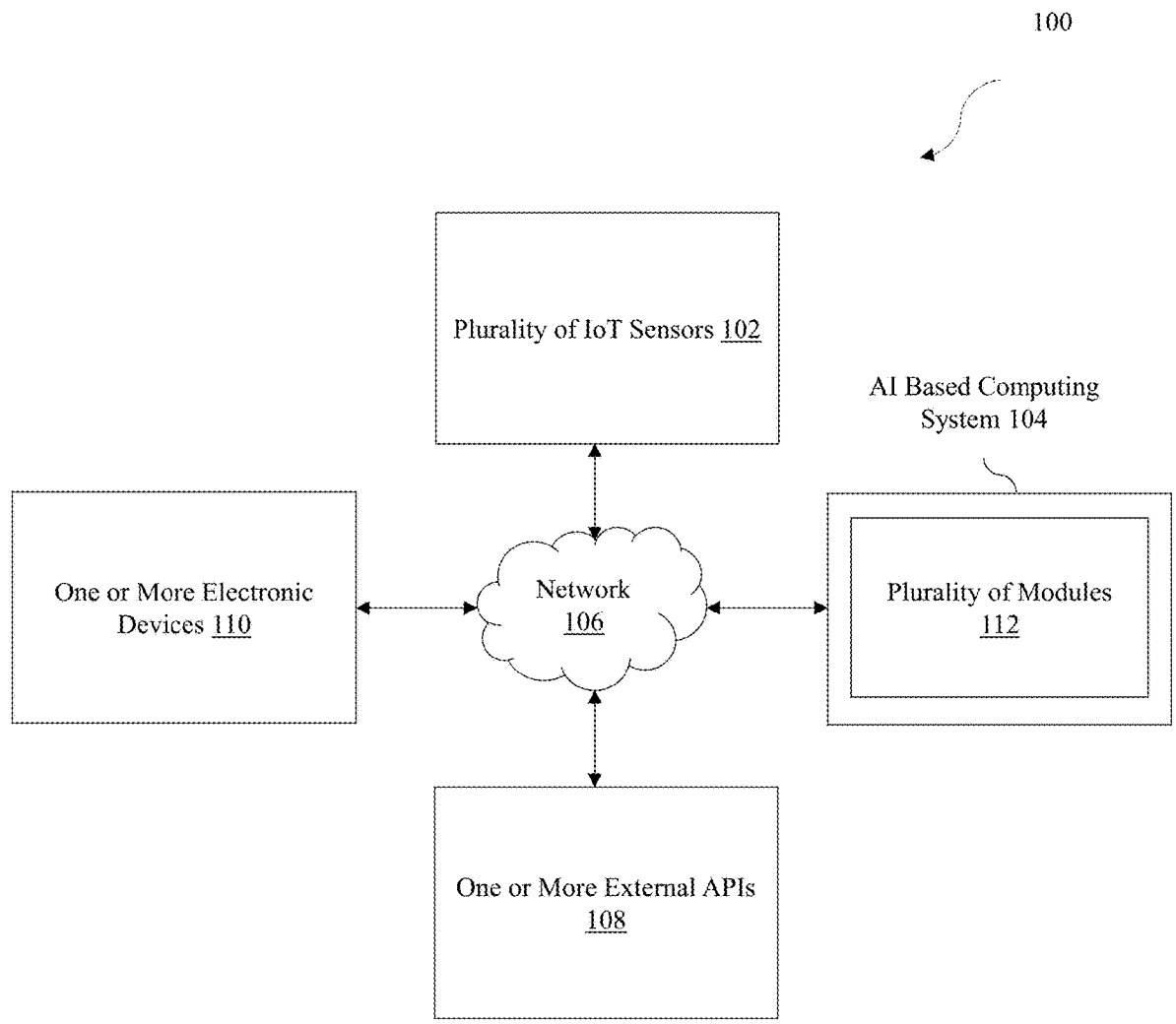
FIG. 1 is a block diagram illustrating an exemplary computing environment for managing nutrient concentrate in water-based solutions, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 9B, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for managing nutrient concentrate in water-based solutions, in accordance with an embodiment of the present disclosure. According to FIG. 1, the computing environment 100 includes a plurality of Internet of Things (IoT) sensors 102 communicatively coupled to an Artificial Intelligence (AI) based computing system 104 via a network 106. The plurality of IOT sensors 102 are installed at one or more farms where crops are sown. In an exemplary embodiment of the present disclosure, the one or more farms are hydroponic farms. The plurality of IOT sensors 102 are configured to capture and provide a set of desired parameters associated with the crops to the AI based computing system 104. In an exemplary embodiment of the present disclosure, the plurality of IOT sensors 102 include temperature sensor, humidity sensor, one or more camera sensors, light sensors and the like. The set of desired parameters include one or more environment parameters, one or more light parameters, nutrient concentration, growth conditions of the crops, crop varieties, developmental stage of the crops and the like. In an embodiment of the present disclosure, the AI based computing system 104 may be hosted on a data measurement unit. The data measurement unit is configured to measure nutrient information of water-based solutions to be fed to the crops. In an embodiment of the present disclosure, the data measurement unit is an IOT sensor. In another embodiment of the present disclosure, the AI based computing system 104 may be hosted on a central server, such as cloud server or a remote server. Further, the network 106 may be internet or any other wireless network.

Further, the computing environment 100 includes one or more external Application Programming Interfaces (APIs) 108 communicatively coupled to the AI based computing system 104 via the network 106. The one or more external APIs 108 are third party platforms which correspond to Enterprise Resource Planning (ERP), centralized Data Warehouse (DWH) and the like. Furthermore, the computing environment 100 includes one or more electronic devices 110 associated with one or more users communicatively coupled to the AI based computing system 104 via the network 106. In an embodiment of the present disclosure, the one or more users are one or more farmers, one or more growers and the like. The one or more electronic devices 110 are used by the one or more users to provide a set of inputs corresponding to the set of desired parameters. The one or more electronic devices 110 may also be used to receive the nutrient information, the set of desired parameters, a set of nutrients recommendation and a set of dosing parameters. In an exemplary embodiment of the present disclosure, the one or more electronic devices 110 may include a laptop computer, desktop computer, tablet computer, smartphone, wearable device, smart watch and the like.

Furthermore, the one or more electronic devices 110 include a local browser, a mobile application or a combination thereof. Furthermore, the one or more users may use a web application via the local browser, the mobile application or a combination thereof to communicate with the AI based computing system 104. In an embodiment of the present disclosure, the computing system 104 includes a plurality of modules 112. Details on the plurality of modules 112 have been elaborated in subsequent paragraphs of the present description with reference to FIG. 2.

In an embodiment of the present disclosure, the AI based computing system 104 is configured to receive the nutrient information of water-based solution to be fed to the crops from the data measurement unit at real-time. Further, the AI based computing system 104 receives the set of desired parameters associated with the crops from one or more sources. The AI based computing system 104 generates the set of nutrients recommendations corresponding to one or more additional nutrients required in the water-based solution for maximum crop yield based on the received nutrient information, the received set of desired parameters, a predefined nutrient information and historical crop data associated with the crops by using a nutrient management based AI model. The AI computing system 104 determines the set of dosing parameters to inject the one or more additional nutrients in the water-based solution via a dosing unit based on the received nutrient information, the received set of desired parameters and the generated set of nutrients recommendations by using the nutrient management based AI model. The AI based computing system 104 outputs the received nutrient information, the received set of desired parameters, the generated set of nutrients recommendation and the determined set of dosing parameters on user interface screen of one or more electronic devices 110 associated with the one or more users.

Figure 2:
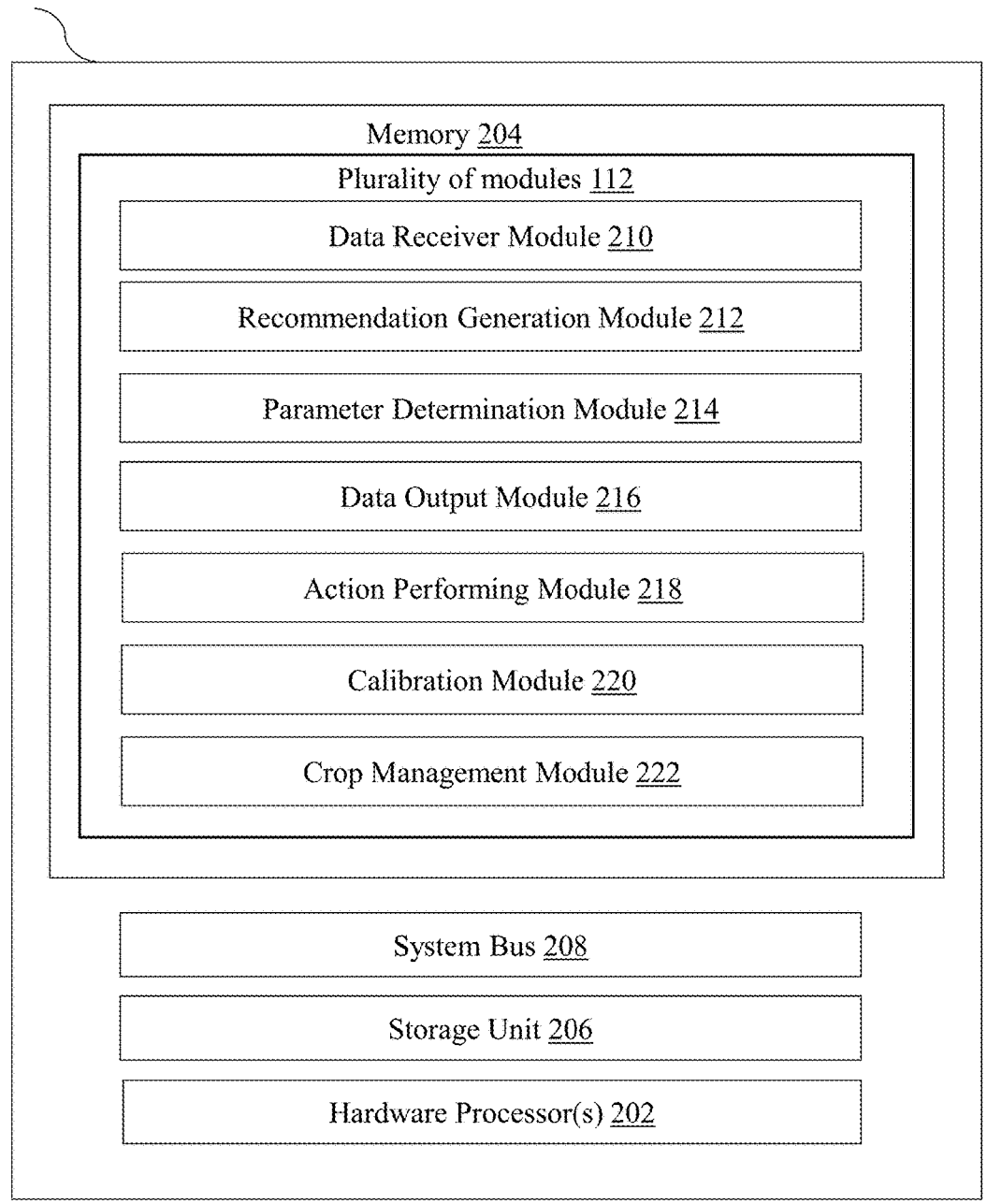
FIG. 2 is a block diagram illustrating an exemplary AI based computing system for managing nutrient concentrate in water-based solutions, in accordance with an embodiment of the present disclosure.

FIG. 2 is a block diagram illustrating an exemplary AI based computing system 104 for managing nutrient concentrate in water-based solutions, in accordance with an embodiment of the present disclosure. Further, the AI based computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 112 in the form of programmable instructions executable by the one or more hardware processors 202. Further, the plurality of modules 112 includes a data receiver module 210, a recommendation generation module 212, a parameter determination module 214, a data output module 216, an action performing module 218, a calibration module 220 and a crop management module 222.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 112 stored in the form of machine-readable instructions on any of the above-mentioned storage media and may be in communication with and executed by the one or more hardware processors 202.

The storage unit 206 may be a cloud database hosted on Amazon web services server. The cloud database is a My Structured Query Language (MYSQL) database that uses Hypertext Processor (PHP) version 7.3.23-1 for programming and File Transfer protocol (FTP) communication protocol for data upload functionality and is developed in Laravel framework. The storage unit 206 may store the nutrient information, the set of desired parameters and the set of nutrient recommendations. The storage unit 206 may also store the predefined nutrient information, the historical crop data, the set of dosing parameters, one or more optimal environment conditions, one or more optimal light conditions, one or more farm recommendations, one or more physiological symptoms, one or more deficiencies and one or more deficiency causes.

The data receiver module 210 is configured to receive the nutrient information of the water-based solution to be fed to crops from the data measurement unit at real-time. For example, the water-based solution is a mixture of water and fertilizer. The water-based solution is stored in one or more nutrient reservoirs. In an exemplary embodiment of the present disclosure, the nutrient information includes nutrient concentrations, potential of Hydrogen (pH) and one or more contaminants. For example, the one or more contaminants include chloride, sodium and the like. In an exemplary embodiment of the present disclosure, the nutrition concentrations include amount of one or more ions corresponding to a set of primary nutrients, a set of secondary nutrients, a set of micro-nutrients or any combination thereof, such as:

| Set of Primary Nutrient | Set of Secondary Nutrients | Set of Micro-Nutrients (Trace Elements) | | | |
|---|---|---|---|---|---|
| Nitrogen (N) | Calcium (Ca) | Iron (Fe) | Manganese (Mn) | Cobalt (Co) |
| Potassium (K) | Magnesium (Mg) | Boron (B) | Molybdenum (Mo) | Nickel (Ni) |
| Phosphorus (P) | Sulphur (S) | Copper (Cu) | Zinc (Zn) | Chloride (Cl) |

In an embodiment of the present disclosure, the data measurement unit includes a set of Ion-Selective Electrodes (ISEs), an Electrical Conductivity (EC) probe, a data acquisition unit, an injection unit, the one or more nutrient reservoirs, an in-line probe assembly, a water inlet, a water outlet, one or more pumps and a pH probe. In an exemplary embodiment of the present disclosure, the set of ISEs may include nitrate ISE, potassium ISE and the like. In an embodiment of the present disclosure, the set of ISEs may also include two types of Nitrogen ISEs that detect different nitrogen species (Nitrate $NO_3^-$ and Ammonia $NH_4^+$) and determine accurate nitrogen concentration according to pH of the water-based solution. Details on the data measurement unit have been elaborated in subsequent paragraphs of the present description with reference to FIG. 5.

Further, the data receiver module 210 is also configured to receive the set of desired parameters associated with the crops from the one or more sources. In an embodiment of the present disclosure, the one or more sources include the plurality of Internet of Things (IoT) sensors 102, the set of inputs from one or more users or a combination thereof. In an exemplary embodiment of the present disclosure, the plurality of IOT sensors 102 include temperature sensor, humidity sensor, one or more camera sensors, light sensors and the like. The set of inputs are provided by the one or more users via the one or more electronic devices 110. In an exemplary embodiment of the present disclosure, the one or more electronic devices 110 may include a laptop computer, desktop computer, tablet computer, smartphone, wearable device, smart watch and the like. In an exemplary embodiment of the present disclosure, the set of desired parameters include one or more environment parameters, one or more light parameters, nutrient concentration, growth conditions of the crops, crop varieties, developmental stage of the crops and the like. For example, the one or more environment parameters include Carbon dioxide (CO2) level, ambient temperature, ambient humidity, potassium, nitrate, EC, pH, water temperature and the like. The one or more light parameters include light intensity, wavelength, PPFD (Photosynthetic Photon Flux Density) in crop zone and the like. The crop varieties may be food crops, cash crops, plantation crops and the like. For example, the development stage of the crops may be vegetative, budding, flowering, ripening and the like.

The recommendation generation module 212 is configured to generate the set of nutrients recommendations corresponding to one or more additional nutrients required in the water-based solution for maximum crop yield based on the received nutrient information, the received set of desired parameters, the predefined nutrient information and the historical crop data associated with the crops by using a nutrient management based AI model. In an embodiment of the present disclosure, the nutrient management based AI model is a Machine Learning (ML) model. The nutrient management based AI model is developed based on the set of desired parameters for hydroponic farm optimization. In an embodiment of the present disclosure, the nutrient management based AI model include statistical models to analyze the historical crop data and provide recommendations and corrections to optime growth. The nutrient management based AI model also includes decision trees to decide autonomously and reduce user interactions, such as dosing nutrients and maintaining acidity levels. Further, the nutrient management based AI model include neural networks that analyze effect of multiple parameters on behavior of crops. In an embodiment of the present disclosure, the predefined nutrient information is look up table for generating nutrient recommendations based the received nutrient information, the received set of desired parameters and the historical crop data. The historical crop data is data about past events and circumstances pertaining to the crops. In generating the set of nutrients recommendations corresponding to one or more additional nutrients required in the water-based solution for maximum crop yield based on the received nutrient information, the received set of desired parameters, the predefined nutrient information and the historical crop data by using the nutrient management based AI model, the recommendation generation module 212 correlates the received nutrient information, the received set of desired parameters, the predefined nutrient information and the historical crop data by using the nutrient management based AI model. Further, the recommendation generation module 212 generates the set of nutrients recommendations based on result of the correlation by using the nutrient management based AI model. For example, the set of nutrients recommendations may be to add a set of ions corresponding to Nitrogen, Sulphur and Zinc in the water-based solution. The one or more additional nutrients in the current example are Nitrogen, Sulphur and Zinc.

The parameter determination module 214 is configured to determine the set of dosing parameters to inject the one or more additional nutrients in the water-based solution via the dosing unit based on the received nutrient information, the received set of desired parameters and the generated set of nutrients recommendations by using the nutrient management based AI model. In an exemplary embodiment of the present disclosure, the set of dosing parameters include number of times, durations of injecting the one or more additional nutrients in the water-based solution, quantity of each of the one or more additional nutrients required in the water-based solution and the like. In an embodiment of the present disclosure, the dosing unit injects the one or more additional nutrients in the water-based solution based on the determined set of dosing parameters. The dosing unit includes a set of precision injection pumps to inject the one or more additional nutrients in the water-based solution stored in the one or more nutrient reservoirs. In an embodiment of the present disclosure, the dosing unit automatically replenishes the one or more additional nutrients required by the water-based solution.

The data output module 216 is configured to output the received nutrient information, the received set of desired parameters, the generated set of nutrients recommendation and the determined set of dosing parameters on user interface screen of the one or more electronic devices 110 associated with the one or more users. In an embodiment of the present disclosure, the data output module 216 outputs the received nutrient information, the received set of desired parameters, the generated set of nutrients recommendation and the determined set of dosing parameters on user dashboard of the user in one or more formats. In an embodiment of the present disclosure, the user dashboard that allows the one or more users to manage equipment and access data from any internet-enabled device. The user dashboard allows farm zone management, hardware management, and also allows the one or more users to provide the set of inputs. In an exemplary embodiment of the present disclosure, the one or more formats include Portable Document Format (PDF), word file, power point presentation, drawings, charts and the like. In an embodiment of the present disclosure, the data output module 216 outputs measurements of pH, the historical crop data and the nutrient information in the water-based solution on user interface screen of the one or more electronic devices 110 at real-time.

The action performing module 218 is configured to detect the one or more environment parameters and the one or more light parameters by using the plurality of IOT sensors 102. Further, the action performing module 218 determines one or more optimal environment conditions for the crops based on the detected one or more environment parameters, the growth conditions of the crops, the crop varieties and the developmental stage of the crops by using a growth management based AI model. In an exemplary embodiment of the present disclosure, the one or more optimal environment conditions include maintaining optimum levels of CO2, temperature, nutrient concentrations, humidity in real-time and the like. Further, the action performing module 218 determines one or more optimal light conditions for the crops based on the detected one or more light parameters, the growth conditions of the crops, the crop varieties and the developmental stage of the crops by using a growth management based AI model. In an exemplary embodiment of the present disclosure, the one or more optimal light conditions include controlling dynamic wavelength, intensity to optimize amount of light required for optimal growth of crops and the like. Furthermore, the action performing module 218 performs one or more actions to achieve the determined one or more optimal environment conditions and the determined one or more optimal light conditions. For example, the one or more actions may include increasing or decreasing water temperature, adding nutrients such as potassium, nitrate and the like, increasing or decreasing ambient temperature, controlling ambient humidity, maintaining CO2 levels, increasing or decreasing light intensity and the like.

The recommendation generation module 212 is configured to retrieve the historical crop data associated with one or more farms where the crops are sown, from the storage unit 206. In an exemplary embodiment of the present disclosure, the one or more farms are hydroponic farms. In an exemplary embodiment of the present disclosure, the historical crop data include previous crop yield in the one or more farms, nutrients available in soil, water or a combination thereof of the one or more farms, pH of the water, potassium, nitrate, EC, water temperature, ambient temperature, ambient humidity, CO2 levels, light intensity in the one or more farms and the like. Further, the recommendation generation module 212 generates one or more farm recommendations to improve production of crop in the one or more farms based on the historical crop data and predefined crop information by using a crop management based AI model. In an embodiment of the present disclosure, the recommendation generation module 212 generates the one or more recommendations by analyzing trends in the historical data. In an exemplary embodiment of the present disclosure, the one or more farm recommendations include injecting nutrients, such as potassium, nitrate and the like in the water-based solution, changing pH of the water-based solution, increasing or decreasing water temperature, adding nutrients, increasing or decreasing ambient temperature, controlling ambient humidity, maintaining CO2 levels, increasing or decreasing light intensity and the like. In an embodiment of the present disclosure, multiple parameters associated with each farm zone, such as potassium, nitrate, EC, pH, water temperature, ambient temperature, ambient humidity, CO2 levels and intensity, along with the historical crop data are outputted on user interface screen of the one or more electronic devices 110.

In an embodiment of the present disclosure, ISE calibration data is obtained including time-series measurements from each sensor along with calibration scope and intercept. The calibration data may be obtained from a plurality of ISEs i.e., 12 Nutrient Film Technique (NFT) systems each with two ISE probes, and subjected to Exploratory Data Analysis (EDA) to assess feasibility of developing an-auto correction model for the set of ISEs. In an embodiment of the present disclosure, EDA may reveal whether zero-drift feasibility requirement is met, which indicates measurement bias. If measurement bias is detected, summary statistics may be calculated on data outputs to assess distribution central tendency, variance and skew. Further, principal component analysis is performed on normalized data to reduce dimensionality and preserve dimensions of maximum variance, Furthermore, measurement distributions are verified to be differentiated categorically via K-means clustering and calculate Silhouette coefficient to measure dissimilarity between clusters and similarity with a cluster. In an exemplary embodiment of the present disclosure, −1 indicates potential misclassification, 0 indicates ambiguous classification and +1 indicates good classification performance. In an embodiment of the present disclosure, the ISE calibration scope is constant and intercepts are varied per probe, indicating measurement bias. The measurement bias drift displays a consistent pattern that is common to the ISE probes for a given ion family. In an embodiment of the present disclosure, Principal Component Analysis (PCA) reduces dimensionality of data and extracts linearly independent features. Furthermore, data is clustered into distinct distributions based on ISE probes using k-means clustering model. The global silhouette score is positive, indicating good clustering performance. In an embodiment of the present disclosure, an AI model is designed for drift auto-correction, multilayer perceptron is used for its ability to intake mixed data and for its variance to existing structure in the data. Further, hyperparameters, such as number of layers, number of neurons and the like may be tuned using cross-validation techniques. In an embodiment of the present disclosure, auto-corrective model may be designed with a many-to-one input/output relationship.

The calibration module 220 receives one or more inputs from a set of sensors for calibrating the set of ISEs. In an exemplary embodiment of the present disclosure, the one or more inputs include ion type, temperature, flow rate, probe runtime since initial calibration of the set of ISEs and the like. In an embodiment of the present disclosure, the one or more inputs are mixed data types, i.e., both categorical and continuous numeric data types. For example, the ion type may be nitrogen or potassium. In an embodiment of the present disclosure, slope of the ISE calibration curve is constant per probe, even in presence of measurement drift. Therefore, drift at a given time may be quantified as delta between ISE calibration line's initial y-intercept and drifted y-intercept. Further, the calibration module 220 predicts delta y-intercept by performing data fusion on the received one or more inputs by using an automated calibration based Multilayer perceptron (MLP) artificial neural network. In an embodiment of the present disclosure, the delta y-intercept is delta between ISE calibration line's initial y-intercept and drifted y-intercept. Further, resilient backpropagation algorithm may be used to train the automated calibration based MLP artificial neural network. A partitioned dataset may be inputted to the automated calibration based MLP artificial neural network for regression prediction of dela intercept over time. The calibration module 220 determines drift corrected ISE measurement voltage based on measured ISE voltage, initial calibration values and the predicted delta y-intercept by using the automated calibration based MLP artificial neural network. The predicted delta y-intercept corresponds to predicted calibration curve y-intercept shift as a function of time. In an embodiment of the present disclosure, initial calibration values may correspond to slope and intercept. Furthermore, the calibration module 220 calibrates the set of ISEs based on the determined drift corrected ISE measurement voltage by using the automated calibration based MLP artificial neural network. In an embodiment of the present disclosure, the automated calibration based MLP artificial neural network automatically correct drift in ISE's calibration scope and reduce calibration frequency. The drift may happen because of ion transport through polymeric membrane. There is a relationship between calibration scope and the time, the ISE has been active in the system, which can be modeled and applied to the model for prediction.

In an embodiment of the present disclosure, the automated calibration based MLP artificial neural network may be assessed by calculating coefficient of determination, R squared, to calculate system level residual errors. Prediction error residuals for training and testing datasets are calculated and captured via Root mean Square Error (RSME). In an embodiment of the present disclosure, a MLP with four nodes are employed, with multiple quantities of hidden layers or neurons tested during hyperparameter tuning. Further, Resilient Backpropagation (RB) is used to train the ANN due to its consistency over Levenberg-Mardquadt Backpropagation (LMBP). In an embodiment of the present disclosure, Rectified Linear Unit (ReLU) may be used as activation function of the neural network, over sigmoid function in approach, as it exhibits robustness to vanishing gradients i.e., an error estimation problem which occurs when using backpropagation in an ANN with more than one hidden layer. The RB or ReLU setup may allow more flexibility and consistency in architecture of the neural network. In an embodiment of the present disclosure, the multilayer perceptron demonstrates satisfactory performance based on error metrics for regression predictive modeling (RMSE>0.2;0.5). RSME between predicted and expected response variables is within the system variance. Furthermore, coefficient of determination is at least 0.7, i.e., at least 70% response variables may be predicted by the regression.

The crop management module 222 is configured to receive one or more physiological symptoms associated with the crops from the one or more electronic devices 110. In an exemplary embodiment of the present disclosure, the crops are leafy green crops, tomato, cannabis, pepper and the like. In an exemplary embodiment of the present disclosure, the one or more physiological symptoms include number of leaves, root mass, harvest weight associated with the crops and the like. Further, the crop management module 222 predicts one or more deficiencies in the crops based on the received one or more physiological symptoms and predefined deficiency information by using a deficiency management based AI model. In an embodiment of the present disclosure, relationships between nutrient levels and upcoming deficiencies, along with other crop parameters such as the one or more environment parameters, the one or more light parameters and the like are identified for generating the deficiency management-based AI model. In an exemplary embodiment of the present disclosure, the one or more deficiencies include one or more deficient nutrients, chlorine deficiency and the like. Furthermore, the crop management module 222 determines one or more deficiency causes responsible for the one or more deficiencies in the crops based on the received one or more physiological symptoms, the predefined deficiency information and the predicted one or more deficiencies by using the deficiency management based AI model. In an exemplary embodiment of the present disclosure, the one or more deficiency causes include deviation from optimal nutrient concentration per type, hazardous pH level of the water-based solution, change in CO2, ambient temperature and ambient humidity, rate of nutrient uptake per type, deviation of nutrient ratio from optimal nutrient ratio, change in pH and the like. For example, deviation from optimal nutrient concentration per type may correspond to nitrogen and potassium. In an exemplary embodiment of the present disclosure, deviation of nutrient ratio may be nitrogen:potassium. In an embodiment of the present disclosure, the predicted one or more deficiencies and the determined one or more deficiency causes are outputted on user interface screen of the one or more electronic devices 110 associated with the one or more users.

In an embodiment of the present disclosure, to generate the deficiency management based AI model, lettuce plants are grown in 4 replicated treatments with 2 NFT system each (8 NFT systems total; 48 plants per system) over a 6-week period. Further, treatment table consist of 4 hydroponic nutrient matrices with varying level of deficiencies:

| Treatment | N | K | EC |
| --- | --- | --- | --- |
| 1 (Control) | 150 ppm | 210 ppm | 1.5 |
| 2 (50% N deficiency) | 75 ppm | 210 ppm | 1.5 |
| 3 (50% K deficiency) | 150 ppm | 105 ppm | 1.5 |
| 4 (25% N and K) | 112 ppm | 157.5 ppm | 1.5 |

The EC of all systems may be held constant to highlight blindness of relying solely on reading of the EC. To ensure the correct deficiency is maintained, nutrient matrices may be calibrated daily. In an embodiment of the present disclosure, real-time data on nitrogen, potassium, EC and pH are collected. Furthermore, air quality sensors record CO2, temperature and humidity. Furthermore, to determine effects of deficiency weekly standard plant tissue analysis is performed to determine nutrient concentrations within plant tissues. Also, daily non-destructive testing using optical sensors is performed to measure chlorophyll A and B deficiencies. In an embodiment of the present disclosure, data from the tissue analysis and non-destructive testing is used to correlate deficiency within plant tissues nutrient status of each NFT system and to visual symptoms. After the 6-week growth period, plants may go through post-harvest evaluation to determine effects of deficiency based on the one or more physiological symptoms, such as number of leaves, root mass and harvest weight. Further, the one or more physiological symptoms may be evaluated against control group. Furthermore, a set of descriptive features may be developed from the data including the one or more physiological symptoms, the nutrient concentration, the chlorophyll deficiencies and the like and used as input to model nutrient deficiency profiles. In an exemplary embodiment of the present disclosure, the set of descriptive features include yield of the crop, color of the crop, sweetness of the crop and the like. Each nutrient matrix may be distinct in chosen feature space, K-means clustering may be performed to test feature separability (set K=4 for number of nutrient matrices). Parameters to be tested include nutrient concentration in the water-based solution, deviation from optimal nutrient concentration per type, rate of nutrient uptake per type, deviation of nutrient ratio from optimal, change in CO2, change in pH and the like. In an embodiment of the present disclosure, differences corresponding to change in pH are noted daily. In an embodiment of the present disclosure, although temperature and humidity deviations are not expected to have a great impact on predictions, the parameters may be tested with expectation of low separability or widespread. Further, normalized subsets of features may be clustered using K-means. In an embodiment of the present disclosure, silhouette score may be calculated incrementally to determine goodness of K-means fit, functioning as a metric for feature separability. Furthermore, features that pass clustering test are used for building the deficiency management based AI model. The global silhouette score is positive and greater than 0.5, indicating good clustering performance, Further, two or more separable features are identified. A confusion matrix is developed to visualize the clustering performance on various features.

Further, a logistic regression may be performed on extracted features to determine likelihood that a given datapoint belongs to a deficient nutrient matrix. Data from deficient nutrient matrices may be labelled as true and control data labelled false. K-fold cross-validation may be performed. Furthermore, training dataset may be used to calculate coefficients of logistic regression. In an embodiment of the present disclosure, logistic regression equation may be evaluated on the test data, weighted by the calculated coefficients, to derive a probability for each datapoint. The probabilities may be binarized to represent a true or false state of belonging to a deficient nutrient matrix (e.g., p>0.5, deficient). A confusion matrix may be created to visualize classification performance. In an embodiment of the present disclosure, one or more metrics, such as accuracy, misclassification (error) rate, recall (sensitivity/true positive rate), false positive rate, precision, prevalence, true negative rate (specificity), f-score, ROC curve and the like. In an embodiment of the present disclosure, the deficiency management based AI model may be tested against existing data with known deficiency based on human or visual inspection at a specified time along data profile. Further, output may be a Boolean for each datapoint, indicating whether it belongs to a deficient distribution. In an embodiment of the present disclosure, delta between time of the earliest observed positive output and the time that the deficiency may be detected is calculated to estimate amount of time that a nutrient deficiency may be predicted by the deficiency management based AI model before it may be detected by manual inspection. In an embodiment of the present disclosure, classification performance metrics may be calculated for the logistic regression. Accuracy, recall, precision and specificity are a least 0.7, indicating good classification performance. F-score is greater than 0.8. Further, the deficiency management based AI model may identify test nutrient data as deficient earlier than when recorded manually. In an embodiment of the present disclosure, number of days that the deficiency management based AI model may predict a deficiency prior to when it is observed is quantified.

Figure 3:
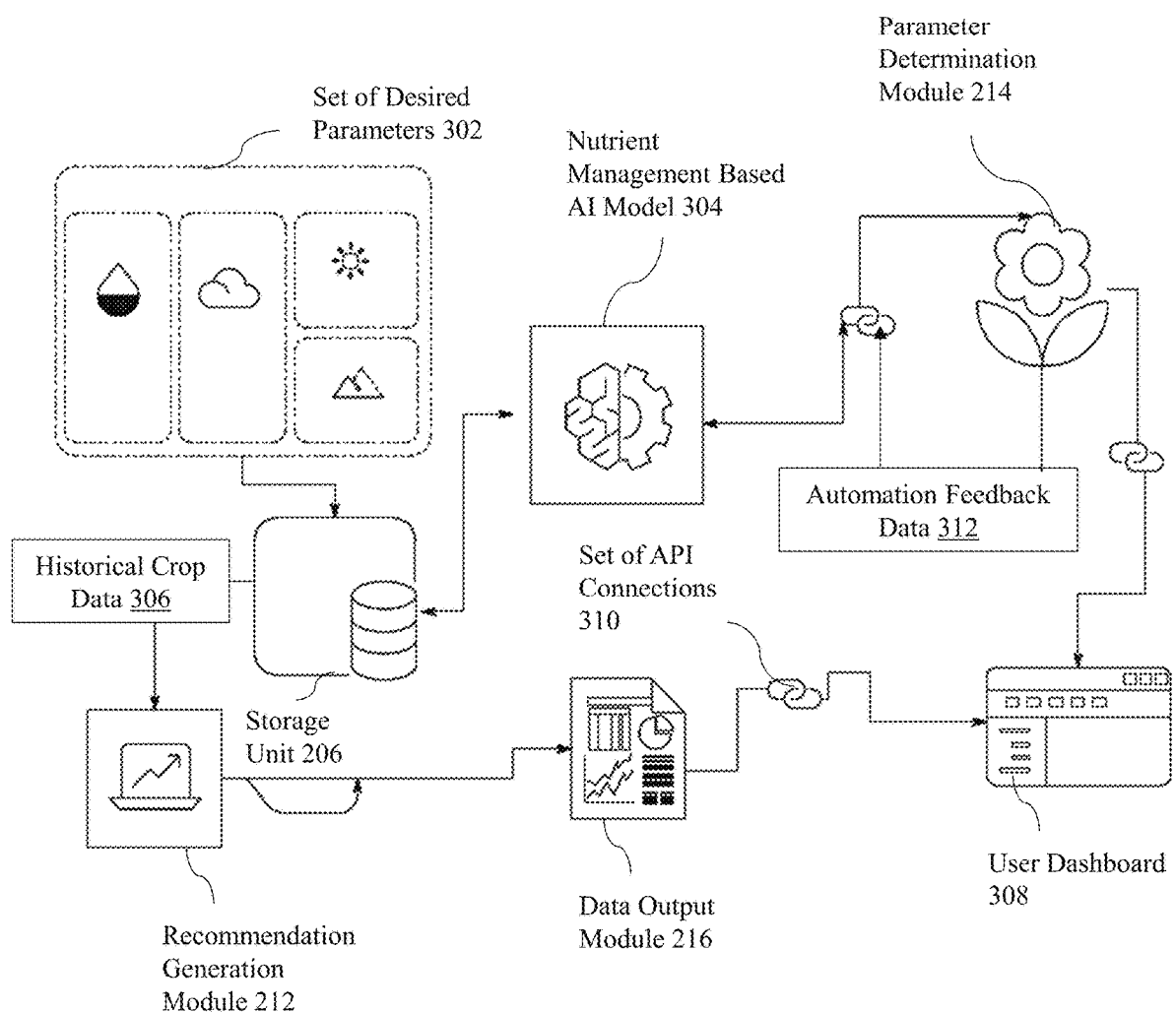
FIG. 3 is a pictorial depiction illustrating an exemplary operation of the AI based computing system for managing nutrient concentrate in water-based solutions, in accordance with an embodiment of the present disclosure.

FIG. 3 is a pictorial depiction illustrating an exemplary operation of the AI based computing system 104 for managing nutrient concentrate in water-based solutions, in accordance with an embodiment of the present disclosure. In an embodiment of the present disclosure, the set of desired parameters 302 associated with the crops are received from the one or more sources, such as the plurality of Internet of Things (IoT) sensors 102, the set of inputs from the one or more users or a combination thereof. In an exemplary embodiment of the present disclosure, the set of desired parameters 302 include one or more environment parameters, one or more light parameters, nutrient concentration, growth conditions of the crops, crop varieties, developmental stage of the crops and the like. For example, the one or more environment parameters include Carbon dioxide (CO2) level, ambient temperature, ambient humidity, potassium, nitrate, EC, pH, water temperature and the like. The one or more light parameters include light intensity, wavelength, PPFD (Photosynthetic Photon Flux Density) in crop zone and the like. In an embodiment of the present disclosure, the nutrient management based AI model 304 is developed using the set of desired parameters 302 for hydroponic farm optimization. Further, the set of desired parameters 302 is stored in the storage unit 206. The recommendation generation module 212 generates the set of nutrients recommendations corresponding to the one or more additional nutrients required in the water-based solution for maximum crop yield based on the nutrient information, the received set of desired parameters 302, the predefined nutrient information and the historical crop data 306 associated with the crops by using a nutrient management based AI model 304. In an embodiment of the present disclosure, the data output module 216 outputs the generated set of nutrients recommendation on user dashboard 308 of the user in the one or more formats, such as Portable Document Format (PDF), word file, power point presentation, drawings, charts and the like, via a set of Application Programming Interface (API) connections 310. Furthermore, the parameter determination module 214 is configured to determine the set of dosing parameters to inject the one or more additional nutrients in the water-based solution via the dosing unit based on the nutrient information, the received set of desired parameters 302 and the generated set of nutrients recommendations by using the nutrient management based AI model 304. In an embodiment of the present disclosure, the determined set of dosing parameters are outputted on user dashboard 308 of the user via the set of API connections 310. Further, an automation feedback data 312, such as temperature, humidity, and the like of the farm, may be used to control the plurality of IOT sensors 102. In an embodiment of the present disclosure, the user may use the dashboard to control the plurality of IOT sensors 102 installed at farms, review historical data and view parameters, such as potassium, nitrate, EC, pH, water temperature, ambient temperature, ambient humidity, CO2 levels and luminous intensity of each farm zone.

Figure 4:
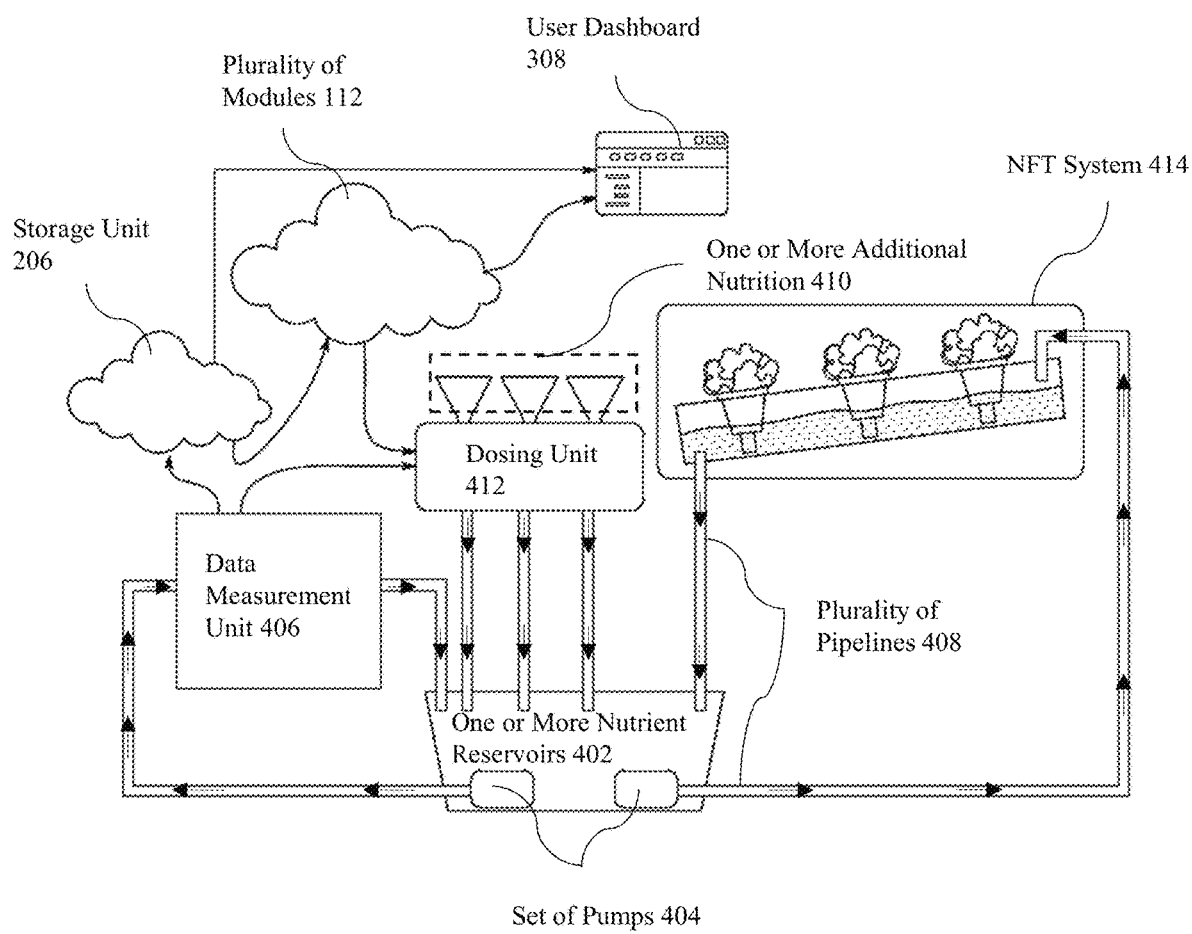
FIG. 4 is a pictorial depiction illustrating an exemplary operation of recirculating hydroponics system, in accordance with an embodiment of the present disclosure.

FIG. 4 is a pictorial depiction illustrating an exemplary operation of recirculating hydroponics system, in accordance with an embodiment of the present disclosure. In an embodiment of the present disclosure, the one or more nutrient reservoirs 402 include water-based solution i.e., mixture of water and fertilizer, having a plurality of nutrients, such as potassium, phosphorus, calcium, magnesium, iron, manganese and the like. Further, set of pumps 404 move the water-based solution from the one or more nutrient reservoirs 402 to the data measurement unit 406 via the water inlet through a plurality of pipelines 408. The data measurement unit 406 determines the nutrient information of the water-based solution to be fed to crops at real-time. In an exemplary embodiment of the present disclosure, the nutrient information includes nutrient concentrations, potential of Hydrogen (pH) and one or more contaminants. Furthermore, the water-based solution is transferred from the data measurement unit 406 to the one or more nutrient reservoirs 402 via water outlet through the plurality of pipelines 408. The plurality of modules 112 of the AI based computing system 104 generates the set of nutrients recommendations corresponding to the one or more additional nutrients 410 required in the water-based solution for maximum crop yield based on the nutrient information, the set of desired parameters 302, the predefined nutrient information and the historical crop data 306 associated with the crops by using the nutrient management based AI model 304. Further, the plurality of modules 112 determine the set of dosing parameters to inject the one or more additional nutrients 410 in the water-based solution via the dosing unit 412 based on the nutrient information, the set of desired parameters 302 and the set of nutrients recommendations by using the nutrient management based AI model 304. The dosing unit 412 includes the set of precision injection pumps to inject the one or more additional nutrients 410 in the water-based solution stored in the one or more nutrient reservoirs 402 based on the set of dosing parameters through the plurality of pipelines 408. In an embodiment of the present disclosure, each of the one or more additional nutrients 410 are stored in separate vessel, such that required nutrients are injected in the water-based solution. In an embodiment of the present disclosure, the nutrient information and the set of dosing parameters are stored in the storage unit 206. Furthermore, the set of pumps 404 moves the water-based solution having the one or more additional nutrients 410 into a channel of the Nutrient Film Technique (NFT) system 414 through the plurality of pipelines 408, as shown in FIG. 4. The nutrients in the water-based solution are absorbed by roots of the crops in the NFT system 414. Further, nutrients not absorbed by the crops flow back into the one or more reservoirs through the plurality of pipelines 408, such that the dosing unit 412 may again add the required nutrients in the water-based solution. The plurality of modules 112 facilitate optimization of nutrient solution recipes and growth conditions. In an embodiment of the present disclosure, the nutrient information, the set of desired parameters 302, the set of nutrients recommendation and the set of dosing parameters are accessed by the user dashboard 308 via the storage unit 206.

Figure 5:
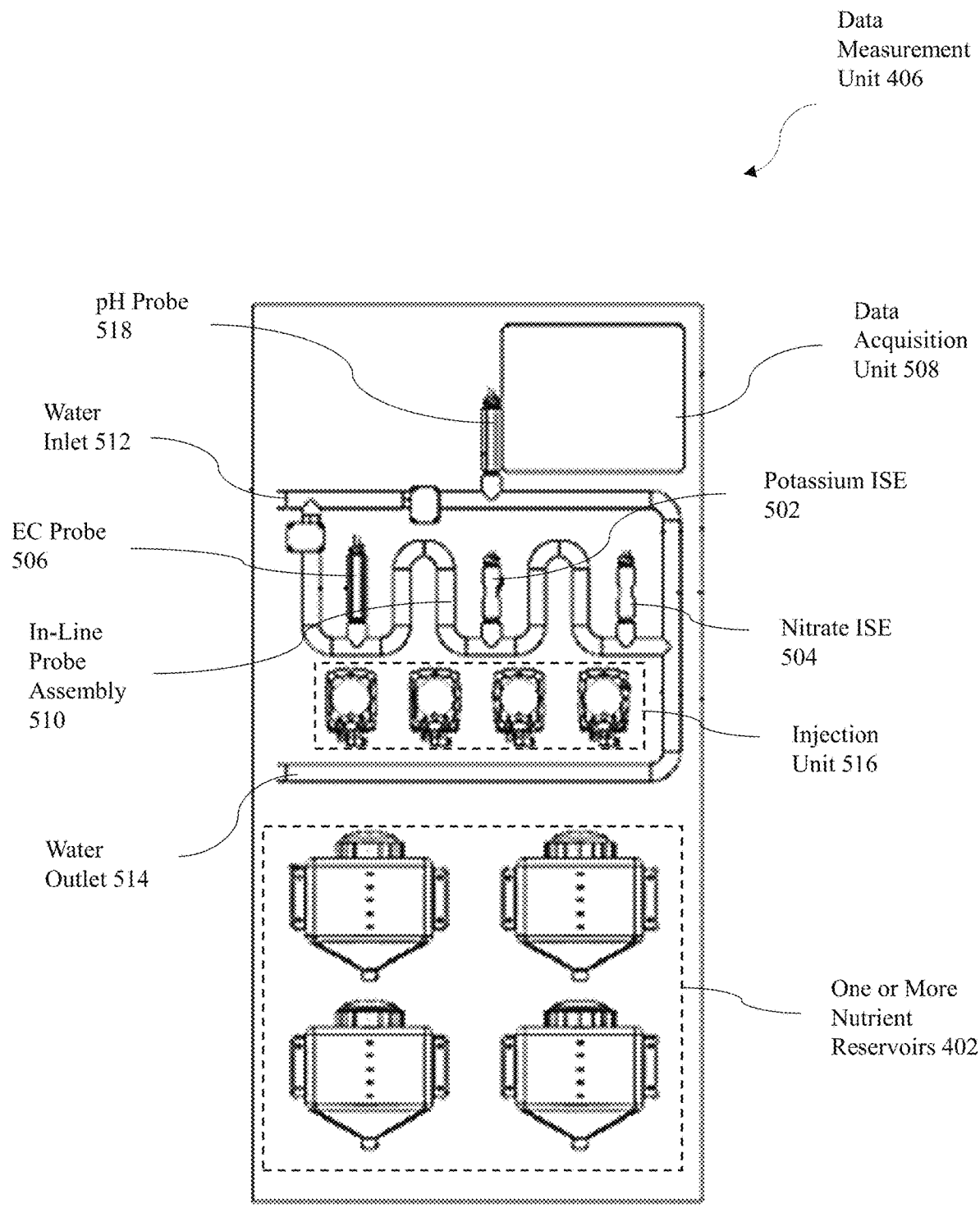
FIG. 5B is a schematic representation illustrating an exemplary data measurement unit for measuring nutrient information of water-based solution, in accordance with another embodiment of the present disclosure.

FIG. 5 is a schematic representation illustrating an exemplary data measurement unit 406 for measuring nutrient information of water-based solution, in accordance with an embodiment of the present disclosure. The data measurement unit 406 includes a potassium ISE 502, a nitrate ISE 504, the Electrical Conductivity (EC) probe 506, the data acquisition unit 508, the in-line probe assembly 510, the water inlet 512 and the water outlet 514, as shown in FIG. 5. In an embodiment of the present disclosure, the data acquisition unit 508 gathers the set of desired parameters 302 and the nutrient information. The data acquisition unit 508 may be a microcontroller to process raw data and then transmit the processed data to the network via an API, such that the processed data may be stored in the storage unit. In an embodiment of the present disclosure, the water-based solution flows from the water inlet 512 through a supply channel and exits from the water outlet 514. The potassium ISE 502 and the nitrate ISE 504 are mounted in-line with the flowing water-based solution to measure the amount of potassium ions and the nitrate ions respectively. The data acquisition unit 508 may send the information related to ion content to a cloud portal. Further, the data measurement unit 406 includes a display screen to display live readings of the amount of potassium ions and the nitrate ions. In an embodiment of the present disclosure, the display screen is updated using real-time data from the storage unit 206. In another embodiment of the present disclosure, the display is updated using a web-based portal. This allows to have an unobstructed flow of the water-based solution while getting live readings. Furthermore, the data obtained via the live readings are uploaded on the storage unit 206 to facilitate historical analysis and trends of growing cycles of crops in the field. This allows the one or more users to optimize their plant cycle and predict future deficiencies. Further, the EC probe 506 is configured to measure the EC of the water-based solution. The in-line probe assembly 510 measures nutrients in the water-based solution, such as nitrogen, phosphorus, iron, cobalt and the like.

In an embodiment of the present disclosure, the data measurement unit 406 includes the injection unit 516, the one or more nutrient reservoirs 402 and the pH probe 518, as shown in FIG. 5. The pH probe may also include a water temperature sensor incorporated in the pH probe. In an embodiment of the present disclosure, the injection unit 516 includes a set of precision injection pumps. The potassium ISE 502 and the nitrate ISE 504 are commercial grade ISEs that measure potassium and nitrate. In an embodiment of the present disclosure, the potassium ISE 502, the nitrate ISE 504, the data acquisition unit 508, the EC probe 506 and the pH probe 518 are installed inline to the one or more nutrient reservoir and provide readings at 2-25-minute time intervals. Further, the data measurement unit 406 includes four peristaltic pumps and four nutrient reservoirs: two for nutrients, one for pH up and one for pH down. In an embodiment of the present disclosure, the dosing unit 412 including precision dosing pumps precisely dose nutrients and maintain a required pH. Furthermore, the data measurement unit 406 includes an 8-inch Liquid Crystal Display (LCD) display which shows real-time readings, also accessible via cloud portal. The data measurement unit 406 offers both cellular and wireless fidelity (WiFi) connectivity.

In an embodiment of the present disclosure, the EC probe 506 is a 2-cell platinum electrode with constant K=1 cm (+−20%) with a temperature range of 0-80'C. Further, measuring range is 1-80 mS. The EC probe 506 also houses a temperature sensor (NTC—30 K) to compensate EC readings for different temperatures of the water-based solution. In an embodiment of the present disclosure, the nitrate ISE 504 and the potassium ISE 502 are industrial, heavy-duty, double junction combination electrodes which houses a Poly-Vinyl Chloride (PVC)-based membrane i.e., NO43 for nitrate and KT43 for potassium, and AG/AgCl as reference electrode/solution. Furthermore, the pH probe 518 is a commercial-grade combination electrode housing a glass membrane with Ag/AgCl as reference electrode/solution. A temperature sensor (PT100RTD) is inbuilt into the electrode for temperature compensation, for high degree of accuracy.

Further, the data acquisition unit 508 includes a high precision 8-channel, 24-bit Analog to Digital Converter (ADC) from Texas instruments (ADS1298), and several low pass filter circuits to protect signals from external noise. Further, digital signal from the ADC is passed to a Particle B Series System-on-a-Module (SoM) based on Nordic nRF52840 micro-controller that acts as a stand-alone cellular endpoint for the system. Further, the peristaltic pump offers various flowrate options depending on hydroponics operation scale (default: 50 ml/min). Peristaltic pumps were chosen to decrease the chance of contamination, as the water-based solutions don't come in contact with any moving parts by this method. In an embodiment of the present disclosure, increasing distance between the EC and ISE probes reduces the interference. Further, interference from the pH probe 518 is irrespective of its location, if it is present in the same water-based solution that is in contact with the ISE anywhere in the system, the readings are heavily influenced. In an embodiment of the present disclosure, probes are set as EC probe 506, potassium ISE 502 and nitrate ISE 504 with 12 inches distance between probes and with readings N=40, to achieve minimum interferences.

Figure 6:
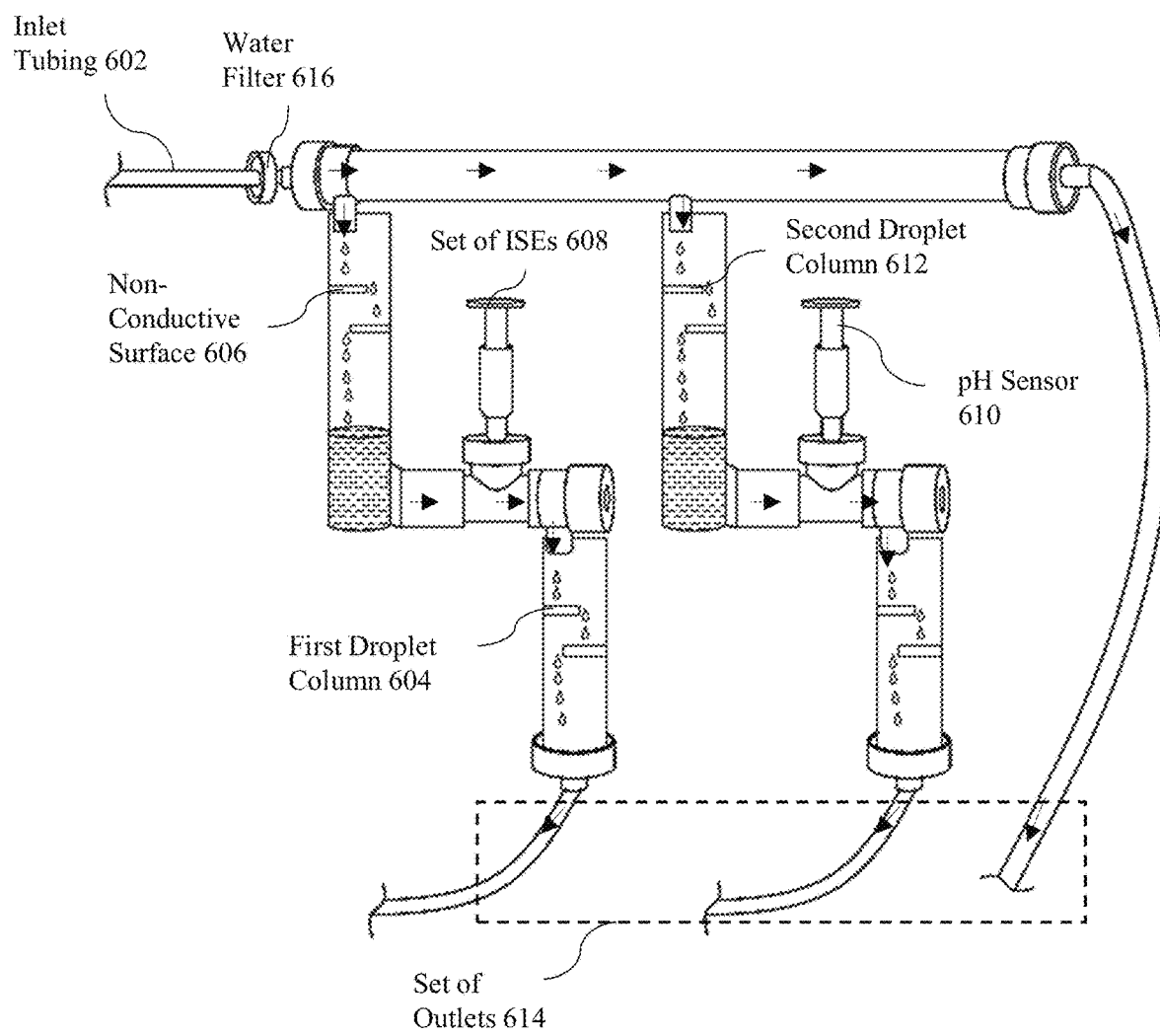
FIG. 6 is a pictorial depiction illustrating an exemplary droplet column-based sensor setup to measure nutrient information, in accordance with an embodiment of the present disclosure.

FIG. 6 is a pictorial depiction illustrating an exemplary droplet column-based sensor setup to measure nutrient information, in accordance with an embodiment of the present disclosure. In an embodiment of the present disclosure, water flows through an inlet tubing 602 from the one or more nutrient reservoirs 402 and enters a first droplet column 604. Further, droplets hit a non-conductive surface 606 multiple times, then enter a sensor chamber, including the set of ISEs 608 and pH sensor 610. The water then enters a second droplet column 612 and goes back to the one or more nutrient reservoirs 402 through the set of outlets 614. In an embodiment of the present disclosure, a water filter 616 is used to filter the water entering inside the inlet tubing 602. In an embodiment of the present disclosure, the sensor chamber is electrically and physically isolated from main reservoir and from water flowing through the system. In an embodiment of the present disclosure, an outer dialysis membrane is introduced around the set of ISEs' sensing part to protect the membrane from leakage and from unspecific binding from contaminants. Further, the dialysis outer membrane may be designed carefully in terms of pore size, hydrophobicity and durability. In an embodiment of the present disclosure, it may be replicated for all probes in the system.

In an embodiment of the present disclosure, the design depicted in FIG. 6, isolates sensors from each other and from the main tank reservoir. Further, ion concentrations are read in real-time directly from the inlet tubing 602 connected to the one or more nutrient reservoirs 402. The design is made by mimicking a "beaker" in tubing system that isolates each of the set of ISEs 608 from rest of the system using air for real-time reading purposes. Thus allows the sensor to measure ionic concentrations in still water, eliminating water flow noise. Furthermore, interferences coming from the set of ISEs 608 and pH sensors, ISEs on each other, and the presence of stray voltage may also be excluded from the generated signal. The design may facilitate faster measurements by excluding time required for the sensors to reach baseline. Further, water from the one or more water reservoirs enters the inlet tubing 602 that is directly connected to the first droplet column 604 and the second droplet column 612. Further, the water gets into the first droplet column 604 and the second droplet column 612 drop by drop while hitting several resistance plates and eventually reaches the sensor chamber. The water leaves the sensor chamber the same way it enters through the first droplet column 604 and the second droplet column 612 and goes back to the one or more nutrient reservoirs 402. Further, the air is allowed to surround the water droplets and protect them from electrical interferences. Furthermore, non-conductive plates may ensure no electricity passes through the water droplets in case the flow increases, and some droplets make waterfall. Further, the design depicted in FIG. 6, also enables us to use single rather than combination ISEs. For example, using one reference electrode for both pH meter and the set of ISEs 608 reduce the cost of sensors.

Figure 7:
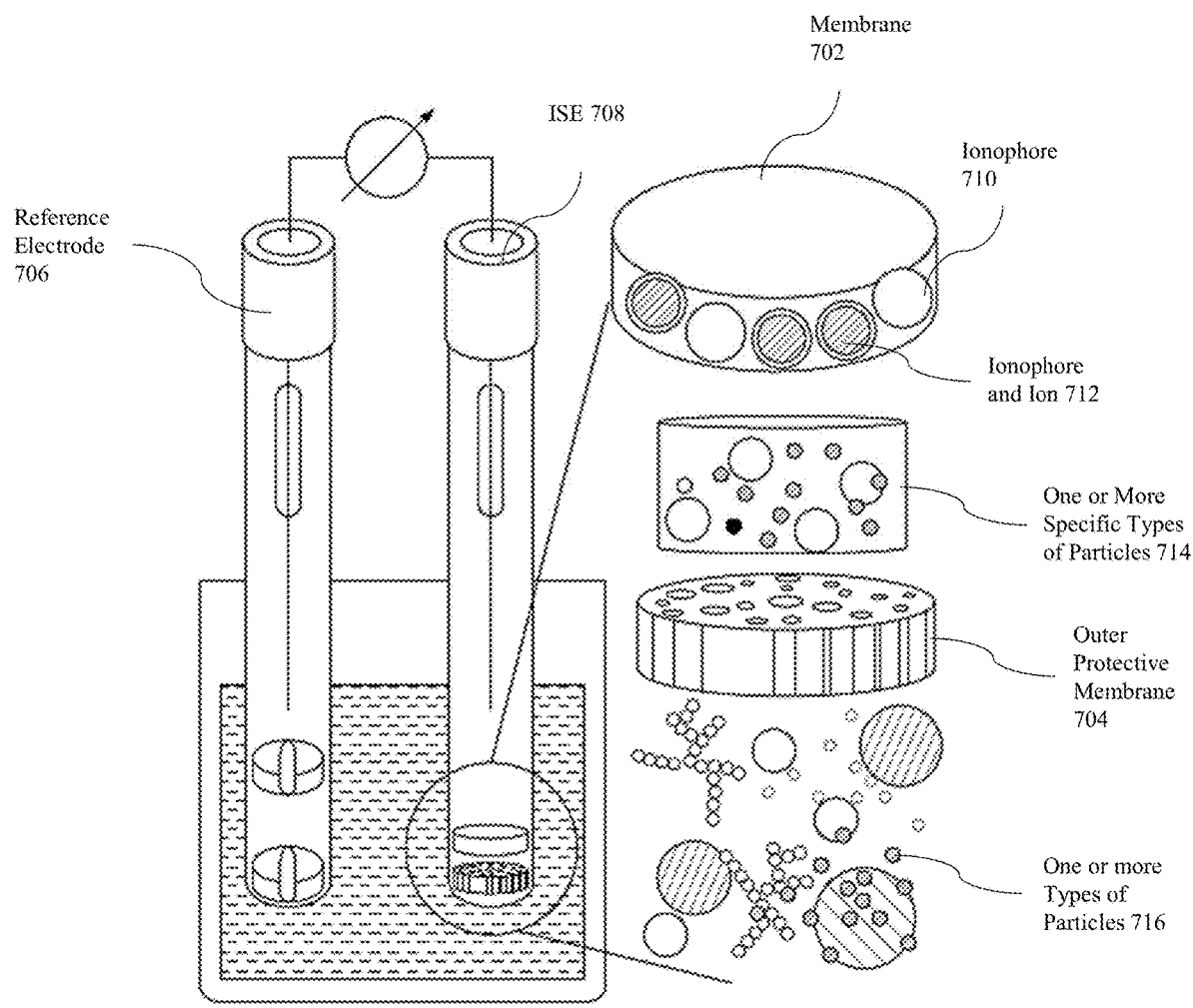
FIG. 7 is a pictorial depiction illustrating an exemplary effect of outer protective membrane on enhancing Ion Selective Electrodes (ISE) specificity, in accordance with an embodiment of the present disclosure.

FIG. 7 is a pictorial depiction illustrating an exemplary effect of outer protective membrane 702 on enhancing Ion Selective Electrodes (ISE) specificity, in accordance with an embodiment of the present disclosure. In an embodiment of the present disclosure, integrate a membrane 702 into sensor assembly to reduce stress impact of flowing water and increase selectivity of the ions. Further, presence of interfering chemicals may be reduced near the membrane 702 by introducing outer protective membrane 704 around ISE's active site. Further, design depicted in FIG. 7, includes reference electrode 706, the ISE 708, ionophore 710 and ionophore along with ion 712. Furthermore, only one or more specific types of particles 714 reach the membrane 702. Further, one or more types of particles 716 are available in testing water.

In an embodiment of the present disclosure, the outer protective membrane 704 is semipermeable protective outer membrane designed with purpose of keeping larger molecules from befouling the delicate PVC inside which permit water and ions to get through. In an alternate embodiment of the present disclosure, a hydrophilic filter may be used with a suitable pore size based on type of the ISE 708 that will be tested on the membrane 702 of the ISE 708. Further, this will let ions passively transport to the membrane 702 based on their sizes and hydrophobicity. For example, addition of a hydrophilic protective outer membrane 702 on calcium ISE may significantly reduce the interfering ions that have higher hydrophobicity. The outer protective membrane 704 is designed for each ISE 708 depending on their cognate ion, thereby eliminating presence of hydrophilic species near the membrane 702 and reducing film formation cause by organic contamination over time. In an embodiment of the present disclosure, commercially available ISEs are compared against ISEs with the outer protective membrane 704 by measuring concentration of serially diluted standard solutions. This may provide information about their sensitivity, selectivity and response. Furthermore, based on these results, it is estimated how long the sensor can generate a reproducible signal in real-time without being calibrated. Further, potassium, nitrate and pH sensors are introduced with a separate double junction reference electrode 704. In an embodiment of the present disclosure, design depicted in FIG. 7, provides isolation of the probes from interferences to increase accuracy and reduces standard deviation of noise. Further, the outer protective membrane 704 increases lifetime of sensors, sensors specificity and sensitivity.

Figure 8:
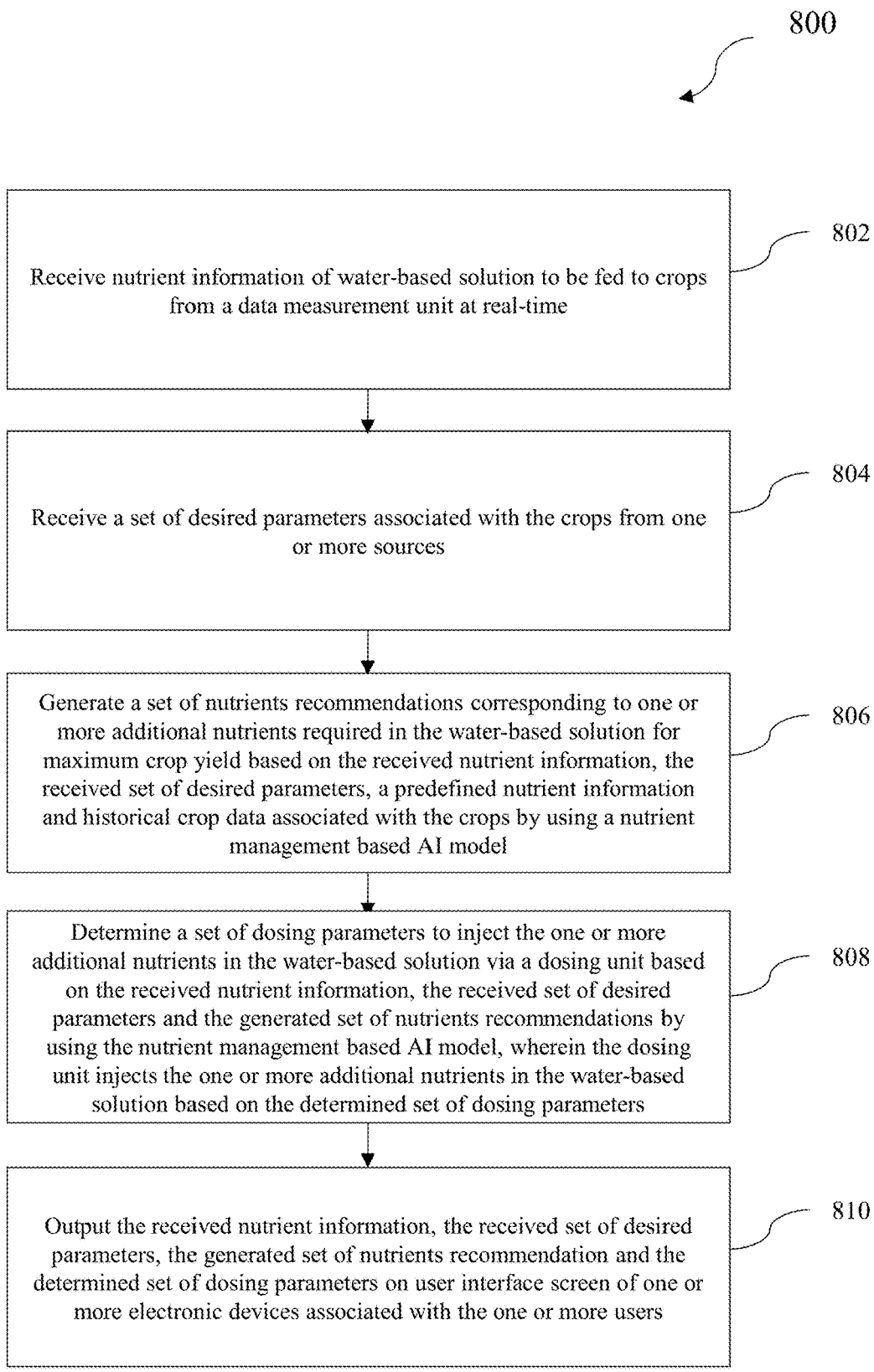
FIG. 8 is a process flow diagram illustrating an exemplary AI based method for managing nutrient concentrate in water-based solutions, in accordance with an embodiment of the present disclosure.

FIG. 8 is a process flow diagram illustrating an exemplary AI based method for managing nutrient concentrate in water-based solutions, in accordance with an embodiment of the present disclosure. At step 802, nutrient information of water-based solution to be fed to crops is received from a data measurement unit 406 at real-time. For example, the water-based solution is a mixture of water and fertilizer. The water-based solution is stored in one or more nutrient reservoirs 402. In an exemplary embodiment of the present disclosure, the nutrient information includes nutrient concentrations, potential of Hydrogen (pH) and one or more contaminants. For example, the one or more contaminants include chloride, sodium and the like. In an exemplary embodiment of the present disclosure, the nutrition concentrations include amount of one or more ions corresponding to a set of primary nutrients, a set of secondary nutrients, a set of micro-nutrients or any combination thereof, such as:

| Set of Primary Nutrient | Set of Secondary Nutrients | Set of Micro-Nutrients (Trace Elements) | | |
|---|---|---|---|---|
| Nitrogen (N) | Calcium (Ca) | Iron (Fe) | Manganese (Mn) | Cobalt (Co) |
| Potassium (K) | Magnesium (Mg) | Boron (B) | Molybdenum (Mo) | Nickel (Ni) |
| Phosphorus (P) | Sulphur (S) | Copper (Cu) | Zinc (Zn) | Chloride (Cl) |

In an embodiment of the present disclosure, the data measurement unit 406 includes a set of Ion-Selective Electrodes (ISEs), an Electrical Conductivity (EC) probe, a data acquisition unit 508, an injection unit 516, the one or more nutrient reservoirs 402, an in-line probe assembly 510, a water inlet 512, a water outlet 514, one or more pumps and a pH probe 518. In an exemplary embodiment of the present disclosure, the set of ISEs may include nitrate ISE 504, potassium ISE 502 and the like. In an embodiment of the present disclosure, the set of ISEs 608 may also include two types of Nitrogen ISEs that detect different nitrogen species (Nitrate $NO_3^-$ and Ammonia $NH_4^+$) and determine accurate nitrogen concentration according to pH of the water-based solution.

At step 804, a set of desired parameters 302 associated with the crops are received from one or more sources. In an embodiment of the present disclosure, the one or more sources include the plurality of Internet of Things (IoT) sensors 102, the set of inputs from one or more users or a combination thereof. In an exemplary embodiment of the present disclosure, the plurality of IOT sensors 102 include temperature sensor, humidity sensor, one or more camera sensors, light sensors and the like. The set of inputs are provided by one or more users via one or more electronic devices 110. In an exemplary embodiment of the present disclosure, the one or more electronic devices 110 may include a laptop computer, desktop computer, tablet computer, smartphone, wearable device, smart watch and the like. In an exemplary embodiment of the present disclosure, the set of desired parameters 302 include one or more environment parameters, one or more light parameters, nutrient concentration, growth conditions of the crops, crop varieties, developmental stage of the crops and the like. For example, the one or more environment parameters include Carbon dioxide (CO2) level, ambient temperature, ambient humidity, potassium, nitrate, EC, pH, water temperature and the like. The one or more light parameters include light intensity, wavelength, PPFD (Photosynthetic Photon Flux Density) in crop zone and the like. The crop varieties may be food crops, cash crops, plantation crops and the like. For example, the development stage of the crops may be vegetative, budding, flowering, ripening and the like.

At step 806, a set of nutrients recommendations corresponding to one or more additional nutrients 410 required in the water-based solution are generated for maximum crop yield based on the received nutrient information, the received set of desired parameters 302, a predefined nutrient information and historical crop data 306 associated with the crops by using a nutrient management based AI model 304. In an embodiment of the present disclosure, the nutrient management based AI model 304 is a Machine Learning (ML) model. The nutrient management based AI model 304 is developed based on the set of desired parameters 302 for hydroponic farm optimization. In an embodiment of the present disclosure, the nutrient management based AI model 304 include statistical models to analyze the historical crop data 306 and provide recommendations and corrections to optime growth. The nutrient management based AI model 304 also includes decision trees to decide autonomously and reduce user interactions, such as dosing nutrients and maintaining acidity levels. Further, the nutrient management based AI model 304 include neural networks that analyze effect of multiple parameters on behavior of crops. In an embodiment of the present disclosure, the predefined nutrient information is look up table for generating nutrient recommendations based the received nutrient information, the received set of desired parameters 302 and the historical crop data 306. The historical crop data 306 is data about past events and circumstances pertaining to the crops. In generating the set of nutrients recommendations corresponding to one or more additional nutrients 410 required in the water-based solution for maximum crop yield based on the received nutrient information, the received set of desired parameters 302, the predefined nutrient information and the historical crop data 306 by using the nutrient management based AI model 304, the AI based method 800 includes correlating the received nutrient information, the received set of desired parameters 302, the predefined nutrient information and the historical crop data 306 by using the nutrient management based AI model 304. Further, the AI based method 800 includes generating the set of nutrients recommendations based on result of the correlation by using the nutrient management based AI model. For example, the set of nutrients recommendations may be to add a set of ions corresponding to Nitrogen, Sulphur and Zinc in the water-based solution. The one or more additional nutrients 410 in the current example are Nitrogen, Sulphur and Zinc.

At step 808, a set of dosing parameters are determined to inject the one or more additional nutrients 410 in the water-based solution via a dosing unit 412 based on the received nutrient information, the received set of desired parameters 302 and the generated set of nutrients recommendations by using the nutrient management based AI model 304. In an exemplary embodiment of the present disclosure, the set of dosing parameters include number of times, durations of injecting the one or more additional nutrients 410 in the water-based solution, quantity of each of the one or more additional nutrients 410 required in the water-based solution and the like. In an embodiment of the present disclosure, the dosing unit 412 injects the one or more additional nutrients 410 in the water-based solution based on the determined set of dosing parameters. The dosing unit 412 includes a set of precision injection pumps to inject the one or more additional nutrients 410 in the water-based solution stored in the one or more nutrient reservoirs 402. In an embodiment of the present disclosure, the dosing unit 412 automatically replenishes the one or more additional nutrients 410 required by the water-based solution.

At step 810, the received nutrient information, the received set of desired parameters 302, the generated set of nutrients recommendation and the determined set of dosing parameters are outputted on user interface screen of one or more electronic devices 110 associated with the one or more users. In an embodiment of the present disclosure, the received nutrient information, the received set of desired parameters 302, the generated set of nutrients recommendation and the determined set of dosing parameters are outputted on user dashboard 308 of the user in one or more formats. In an embodiment of the present disclosure, the user dashboard 308 that allows the one or more users to manage equipment and access data from any internet-enabled device. The user dashboard 308 allows farm zone management, hardware management, and also allows the one or more users to provide the set of inputs. In an exemplary embodiment of the present disclosure, the one or more formats include Portable Document Format (PDF), word file, power point presentation, drawings, charts and the like. In an embodiment of the present disclosure, measurements of pH, the historical crop data 306 and the nutrient information in the water-based solution are outputted on user interface screen of the one or more electronic devices 110 at real-time Further, the AI based method 800 includes detecting the one or more environment parameters and the one or more light parameters by using the plurality of IOT sensors 102. Furthermore, the AI based method 800 includes determining one or more optimal environment conditions for the crops based on the detected one or more environment parameters, the growth conditions of the crops, the crop varieties and the developmental stage of the crops by using a growth management based AI model. In an exemplary embodiment of the present disclosure, the one or more optimal environment conditions include maintaining optimum levels of CO2, temperature, nutrient concentrations, humidity in real-time and the like. Further, the AI based method 800 includes determining one or more optimal light conditions for the crops based on the detected one or more light parameters, the growth conditions of the crops, the crop varieties and the developmental stage of the crops by using a growth management based AI model. In an exemplary embodiment of the present disclosure, the one or more optimal light conditions include controlling dynamic wavelength, intensity to optimize amount of light required for optimal growth of crops and the like. Furthermore, the AI based method 800 includes performing one or more actions to achieve the determined one or more optimal environment conditions and the determined one or more optimal light conditions. For example, the one or more actions may include increasing or decreasing water temperature, adding nutrients, increasing or decreasing ambient temperature, controlling ambient humidity, maintaining CO2 levels, increasing or decreasing light intensity and the like.

Furthermore, the AI based method 800 includes retrieving the historical crop data 306 associated with one or more farms where the crops are sown, from the storage unit 206. In an exemplary embodiment of the present disclosure, the one or more farms are hydroponic farms. In an exemplary embodiment of the present disclosure, the historical crop data 306 include previous crop yield in the one or more farms, nutrients available in water, soil or a combination thereof of the one or more farms, pH of the water, potassium, nitrate, EC, water temperature, ambient temperature, ambient humidity, CO2 levels, light intensity in the one or more farms and the like. Further, the AI based method 800 includes generating one or more farm recommendations to improve production of crop in the one or more farms based on the historical crop data 306 and predefined crop information by using a crop management based AI model. In an embodiment of the present disclosure, the AI based method 800 includes generating the one or more recommendations by analyzing trends in the historical data. In an exemplary embodiment of the present disclosure, the one or more farm recommendations include injecting nutrients, such as potassium, nitrate and the like in the water-based solution, changing pH of the water-based solution, increasing or decreasing water temperature, adding nutrients, increasing or decreasing ambient temperature, controlling ambient humidity, maintaining CO2 levels, increasing or decreasing light intensity and the like. In an embodiment of the present disclosure, multiple parameters associated with each farm zone, such as potassium, nitrate, EC, pH, water temperature, ambient temperature, ambient humidity, CO2 levels and intensity, along with the historical crop data 306 are outputted on user interface screen of the one or more electronic devices 110.

In an embodiment of the present disclosure, the AI based method 800 includes receiving one or more inputs from a set of sensors for calibrating the set of ISEs 608. In an exemplary embodiment of the present disclosure, the one or more inputs include ion type, temperature, flow rate, probe runtime since initial calibration of the set of ISEs 608 and the like. In an embodiment of the present disclosure, the one or more inputs are mixed data types, i.e., both categorical and continuous numeric data types. For example, the ion type may be nitrogen or potassium. In an embodiment of the present disclosure, slope of the ISE calibration curve is constant per probe, even in presence of measurement drift. Therefore, drift at a given time may be quantified as delta between ISE calibration line's initial y-intercept and drifted y-intercept. Further, the AI based method 800 includes predicting delta y-intercept by performing data fusion on the received one or more inputs by using an automated calibration based Multilayer perceptron (MLP) artificial neural network. In an embodiment of the present disclosure, the delta y-intercept is delta between ISE calibration line's initial y-intercept and drifted y-intercept. Further, resilient backpropagation algorithm may be used to train the automated calibration based MLP artificial neural network. A partitioned dataset may be inputted to the automated calibration based MLP artificial neural network for regression prediction of dela intercept over time. The ML based method 800 includes determining drift corrected ISE measurement voltage based on measured ISE voltage, initial calibration values and the predicted delta y-intercept by using the automated calibration based MLP artificial neural network. The predicted delta y-intercept corresponds to predicted calibration curve y-intercept shift as a function of time. In an embodiment of the present disclosure, initial calibration values may correspond to slope and intercept. Furthermore, the ML based method 800 includes calibrating the set of ISEs 608 based on the determined drift corrected ISE measurement voltage by using the automated calibration based MLP artificial neural network. In an embodiment of the present disclosure, the automated calibration based MLP artificial neural network automatically correct drift in ISE's calibration scope and reduce calibration frequency. The drift may happen because of ion transport through polymeric membrane. There is a relationship between calibration scope and the time, the ISE has been active in the system, which can be modeled and applied to the model for prediction.

Further, the AI based method 800 includes receiving one or more physiological symptoms associated with the crops from the one or more electronic devices 110. In an exemplary embodiment of the present disclosure, the crops are leafy green crops, tomato, cannabis, pepper and the like. In an exemplary embodiment of the present disclosure, the one or more physiological symptoms include number of leaves, root mass, harvest weight associated with the crops and the like. Further, the AI based method 800 includes predicting one or more deficiencies in the crops based on the received one or more physiological symptoms and predefined deficiency information by using a deficiency management based AI model. In an embodiment of the present disclosure, relationships between nutrient levels and upcoming deficiencies, along with other crop parameters such as the one or more environment parameters, the one or more light parameters and the like are identified for generating the deficiency management based AI model. In an exemplary embodiment of the present disclosure, the one or more one or more deficiencies include one or more deficient nutrients, chlorine deficiency and the like. Furthermore, the AI based method 800 includes determining one or more deficiency causes responsible for the one or more deficiencies in the crops based on the received one or more physiological symptoms, the predefined deficiency information and the predicted one or more deficiencies by using the deficiency management based AI model. In an exemplary embodiment of the present disclosure, the one or more deficiency causes include deviation from optimal nutrient concentration per type, hazardous pH level of the water-based solution, change in CO2, ambient temperature and ambient humidity, rate of nutrient uptake per type, deviation of nutrient ratio from optimal nutrient ratio, change in pH and the like. For example, deviation from optimal nutrient concentration per type may correspond to nitrogen and potassium. In an exemplary embodiment of the present disclosure, deviation of nutrient ratio may be nitrogen:potassium. In an embodiment of the present disclosure, the predicted one or more deficiencies and the determined one or more deficiency causes are outputted on user interface screen of the one or more electronic devices 110 associated with the one or more users.

The AI based method 800 may be implemented in any suitable hardware, software, firmware, or combination thereof.

Figure 9A:
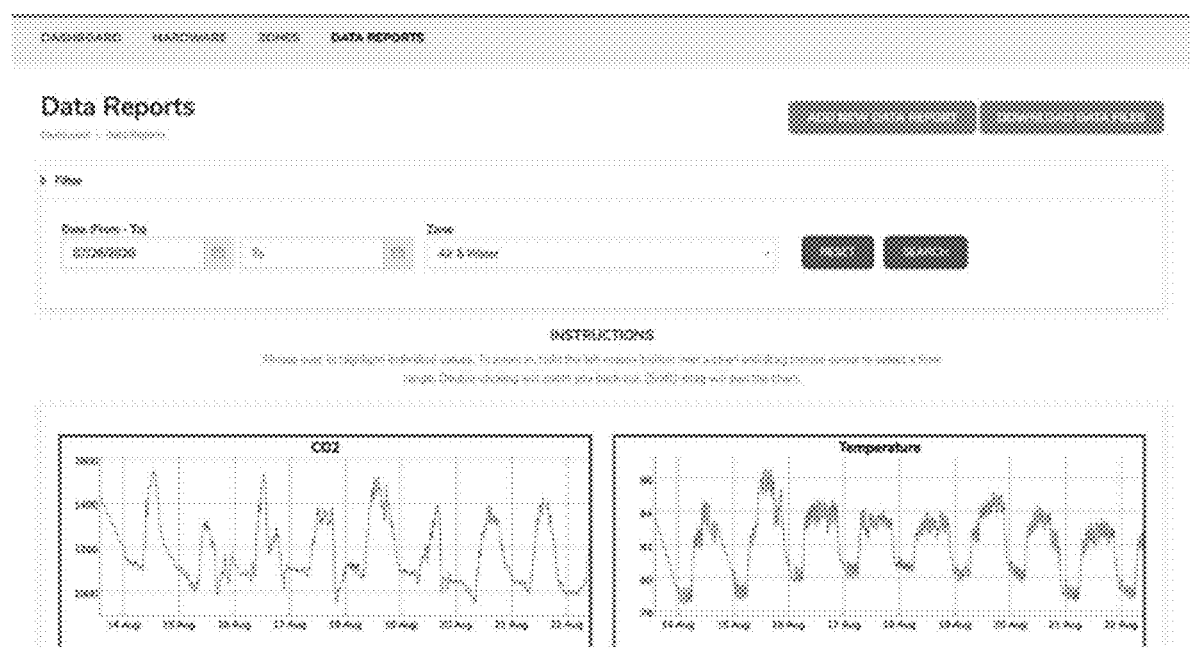
FIGS. 9A-9B are graphical user interface screens of the AI based computing system for managing nutrient concentrate in water-based solutions, in accordance with an embodiment of the present disclosure.
Figure 9B:
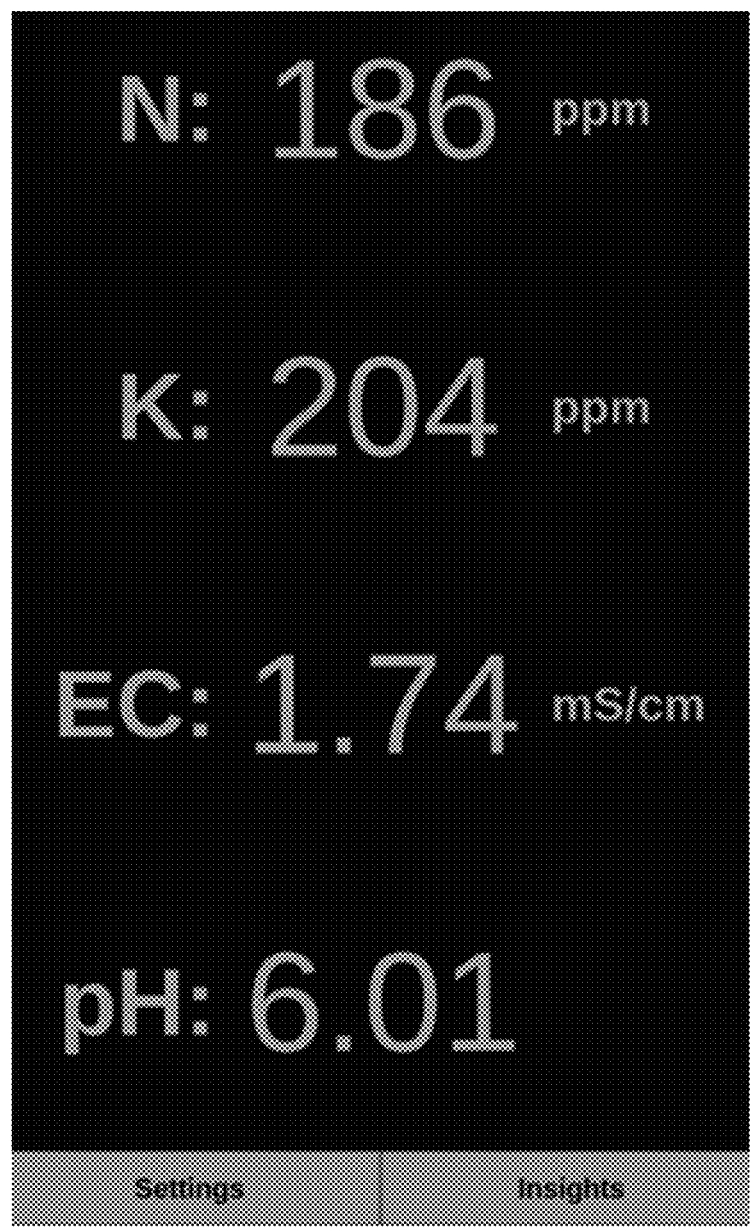

FIGS. 9A-9B are graphical user interface screens of the AI based computing system for managing nutrient concentrate in water-based solutions, in accordance with an embodiment of the present disclosure. The graphical user interface screen of FIG. 9A shows CO2 and temperature of one or more farms measured by the plurality of IOT sensors 102. The one or more users may also use multiple filters, such as date, zone and the like to refine access specific data reports. Further, the user may also add new data report and download data files. The graphical user interface screen of FIG. 9B shows the nutritional concentrations, such as nitrogen, potassium, electrical conductivity, pH and the like, measured by the data measurement unit 406.

Thus, various embodiments of the present AI based computing system 104 provide a solution to manage nutrient concentrate in water-based solutions. The AI based computing system 104 benefits the growers by providing information about different levels of nutrients available to the plants allowing the growers to optimize their recipes in real-time, resulting in higher yields and reductions in fertilizer cost through precision dosing. The AI based computing system 104 provides information in real-time to be acted upon immediately. The AI based computing system 104 provides nutrient analysis on a constant basis to every farm with deeper insights in real-time. In a way, the AI based computing system 104 brings the lab to the farm, with information about nutrient analysis at low cost and allows small farms to continue growing as an operation to generate consistent and optimized yields. Further, the AI based computing system 104 for real-time monitoring of nutrient concentrate in water-based solutions have the additional applicability to measure nutrient levels in water treatment facilities, swimming pool treatment, water testing for large bodies of water, solutions for growing food on the international space station, and the like. In an embodiment of the present disclosure, the data measurement unit 406 is compact and durable for on-site operations. Furthermore, the AI based computing system 104 performs nutrient, air quality and light management and provides Controlled Environment Agriculture (CEA) farmers with real-time information about nutrient content in the water-based solution of their crops, helping them to manage and optimize their nutrient solution with a decision support system powered by AI. The AI based computing system 104 minimize fertilizer and water waste, helping farmers to lower costs and maximize yields, significantly increasing the viability and reducing environmental impact of CEA farming. The AI based computing system 104 also addresses sensor drift, by automatically calibrating the sensors in short intervals by using supervised learning technique. Further, adoption of the AI based computing system 104 requires growers to use new and optimized nutrient mixes with single or few nutrients in each. In an embodiment of the present disclosure, the AI based computing system 104 helps crops to reach their maximum yield potential by providing optimized growth conditions by responding to crop's needs in real-time and maintaining nutrient levels stable over time, which prevents plants from developing nutrient deficiencies, thus preventing yield loss. Further, the AI based computing system 104 decrease fertilizers cost to growers as nutrients are automatically replenished on as-needed basis rather than guessing nutrient levels or having to discard and replace the entire nutrient solution. The AI based computing system 104 reduce labour cost by automating plant growth process and making autonomous decisions. Furthermore, the AI based computing system 104 reduce water consumption of hydroponic farm operations by increasing time between nutrient solution changes and enabling broader adoption of recirculating systems. The AI based computing system 104 promote sustainability and reduce environmental impact of hydroponic farming by preserving minerals, reducing water waste and minimizing fertilizer run-off. Further, the AI based computing system 104 promote food security and increased access to healthy, fresh produce to consumers by increasing economic viability of small-to-medium hydroponic farm businesses, helping to make locally grown produce more accessible and scalable. The AI based computing system 104 employs AI models trained on the historical crop data 306 to uncover insights about growth, performance trends, and plant crop specific optimal levels. The analysis may extract relevant information from large datasets to develop models for optimal levels of crop input parameters. The AI based computing system 104 predicts an upcoming deficiency in a plant before any visible sign are present. This would allow growers using our dosing system to perform early correction and avoid reductions in yield.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. An Artificial Intelligence (AI) based computing system for managing nutrient concentrate in water-based solutions, the computing system comprising:
   one or more hardware processors; and
   a memory coupled to the one or more hardware processors, wherein the memory comprises a plurality of modules in the form of programmable instructions executable by the one or more hardware processors, wherein the plurality of modules comprises:
   a data receiver module configured to:
      receive nutrient information of water-based solution to be fed to crops from a data measurement unit at real-time, wherein the nutrient information comprises nutrient concentrations, potential of Hydrogen (pH) and one or more contaminants and wherein the nutrition concentrations comprise: amount of one or more ions corresponding to at least one of: a set of primary nutrients, a set of secondary nutrients and a set of micro-nutrients;
      receive a set of desired parameters associated with the crops from one or more sources, wherein the one or more sources comprise at least one of: a plurality of Internet of Things (IoT) sensors and a set of inputs from one or more users and wherein the set of desired parameters comprise: one or more environment parameters, one or more light parameters, nutrient concentration, growth conditions of the crops, crop varieties and developmental stage of the crops;
   a recommendation generation module configured to generate a set of nutrients recommendations corresponding to one or more additional nutrients required in the water-based solution for maximum crop yield based on the received nutrient information, the received set of desired parameters, a predefined nutrient information and historical crop data associated with the crops by using a nutrient management based AI model;
   a parameter determination module configured to determine a set of dosing parameters to inject the one or more additional nutrients in the water-based solution via a dosing unit based on the received nutrient information, the received set of desired parameters and the generated set of nutrients recommendations by using the nutrient management based AI model, wherein the dosing unit injects the one or more additional nutrients in the water-based solution based on the determined set of dosing parameters; and
   a data output module configured to output the received nutrient information, the received set of desired parameters, the generated set of nutrients recommendation and the determined set of dosing parameters on user interface screen of one or more electronic devices associated with the one or more users.

2. The AI based computing system of claim 1, wherein the set of primary nutrients comprise: Nitrogen (N), Potassium (K) and Phosphorus (P), wherein the set of secondary nutrients comprise: Calcium (Ca), Magnesium (Mg) and Sulphur (S), and wherein the set of micro-nutrients comprise: Iron (Fe), Manganese (Mn), Cobalt (Co), Boron (B), Molybdenum (Mo), Nickel (Ni), Copper (Cu), Zinc (Zn) and Chloride (Cl).

3. The AI based computing system of claim 1, wherein the data measurement unit comprises: a set of Ion-Selective Electrodes (ISEs), an Electrical Conductivity (EC) probe, a data acquisition unit, an injection unit, one or more nutrient reservoirs, an in-line probe assembly, a water inlet, a water outlet, one or more pumps and a pH probe.

4. The AI based computing system of claim 1, wherein the one or more environment parameters comprise: Carbon dioxide (CO2) level, ambient temperature, ambient humidity, potassium, nitrate, EC, pH and water temperature, wherein the one or more light parameters comprise: light intensity, wavelength and PPFD (Photosynthetic Photon Flux Density) in crop zone.

5. The AI based computing system of claim 1, wherein the set of dosing parameters comprise: number of times, durations of injecting the one or more additional nutrients in the water-based solution and quantity of each of the one or more additional nutrients required in the water-based solution.

6. The AI based computing system of claim 1, wherein in generating the set of nutrients recommendations corresponding to one or more additional nutrients required in the water-based solution for maximum crop yield based on the received nutrient information, the received set of desired parameters, the predefined nutrient information and the historical crop data by using the nutrient management based AI model, the recommendation generation module is configured to:
correlate the received nutrient information, the received set of desired parameters, the predefined nutrient information and the historical crop data by using the nutrient management based AI model; and
generate the set of nutrients recommendations based on result of the correlation by using the nutrient management based AI model.

7. The AI based computing system of claim 1, further comprises an action performing module configured to:
detect the one or more environment parameters and the one or more light parameters by using the plurality of IOT sensors;
determine one or more optimal environment conditions for the crops based on the detected one or more environment parameters, the growth conditions of the crops, the crop varieties and the developmental stage of the crops by using a growth management based AI model, wherein the one or more optimal environment conditions comprise: maintaining optimum levels of CO2, temperature, nutrient concentrations and humidity in real-time;
determine one or more optimal light conditions for the crops based on the detected one or more light parameters, the growth conditions of the crops, the crop varieties and the developmental stage of the crops by using a growth management based AI model, wherein the one or more optimal light conditions comprise: controlling dynamic wavelength and intensity to optimize amount of light required for optimal growth of crops; and
perform one or more actions to achieve the determined one or more optimal environment conditions and the determined one or more optimal light conditions.

8. The AI based computing system of claim 1, wherein the recommendation generation module is configured to:
retrieve the historical crop data associated with one or more farms where the crops are sown, from a storage unit, wherein the historical crop data comprise: previous crop yield in the one or more farms, nutrients available in at least one of: water and soil of the one or more farms, pH of the water, potassium, nitrate, EC, water temperature, ambient temperature, ambient humidity, CO2 levels and light intensity in the one or more farms; and
generate one or more farm recommendations to improve production of crop in the one or more farms based on the historical crop data and predefined crop information by using a crop management based AI model, wherein the one or more farm recommendations comprise: injecting nutrients in the water-based solution, changing pH of the water-based solution, one of: increasing and decreasing water temperature, one of: increasing and decreasing ambient temperature, controlling ambient humidity, maintaining CO2 levels and one of: increasing and decreasing light intensity.

9. The AI based computing system of claim 1, further comprises a calibration module configured to:
receive one or more inputs from a set of sensors for calibrating a set of ISEs, wherein the one or more inputs comprise: ion type, temperature, flow rate and probe runtime since initial calibration of the set of ISEs;
predict delta y-intercept by performing data fusion on the received one or more inputs by using an automated calibration based Multilayer perceptron (MLP) artificial neural network, wherein the delta y-intercept is delta between ISE calibration line's initial y-intercept and drifted y-intercept;
determine drift corrected ISE measurement voltage based on measured ISE voltage, initial calibration values and the predicted delta y-intercept by using the automated calibration based MLP artificial neural network; and
calibrate the set of ISEs based on the determined drift corrected ISE measurement voltage by using the automated calibration based MLP artificial neural network.

10. The AI based computing system as claimed in claim 1, further comprises a crop management module configured to:
receive one or more physiological symptoms associated with the crops from one or more electronic devices, wherein the one or more physiological symptoms comprise: number of leaves, root mass and harvest weight associated with the crops;
predict one or more deficiencies in the crops based on the received one or more physiological symptoms and predefined deficiency information by using a deficiency management based AI model, wherein the one or more one or more deficiencies comprise: one or more deficient nutrients and chlorophyll deficiency; and
determine one or more deficiency causes responsible for the one or more deficiencies in the crops based on the received one or more physiological symptoms, the predefined deficiency information and the predicted one or more deficiencies by using the deficiency management based AI model, wherein the one or more deficiency causes comprise: deviation from optimal nutrient concentration per type, hazardous pH level of the water based solution, change in CO2, ambient temperature and ambient humidity, rate of nutrient uptake per type, deviation of nutrient ratio from optimal nutrient ratio and change in pH and wherein the predicted one or more deficiencies and the determined one or more deficiency causes are outputted on user interface screen of the one or more electronic devices associated with the one or more users.

11. An Artificial intelligence (AI) based method for managing nutrient concentrate in water-based solutions, the AI based method comprising:
receiving, by one or more hardware processors, nutrient information of water-based solution to be fed to crops from a data measurement unit at real-time, wherein the nutrient information comprise: nutrient concentrations, potential of Hydrogen (pH) and one or more contaminants and wherein the nutrition concentrations comprise: amount of one or more ions corresponding to at least one of: a set of primary nutrients, a set of secondary nutrients and a set of micro-nutrients;
receiving, by the one or more hardware processors, a set of desired parameters associated with the crops from one or more sources, wherein the one or more sources comprise at least one of: a plurality of Internet of Things (IoT) sensors and a set of inputs from one or more users and wherein the set of desired parameters comprise: one or more environment parameters, one or more light parameters, nutrient concentration, growth conditions of the crops, crop varieties and developmental stage of the crops;
generating, by the one or more hardware processors, a set of nutrients recommendations corresponding to one or more additional nutrients required in the water-based solution for maximum crop yield based on the received nutrient information, the received set of desired parameters, a predefined nutrient information and historical crop data associated with the crops by using a nutrient management based AI model;
determining, by the one or more hardware processors, a set of dosing parameters to inject the one or more additional nutrients in the water-based solution via a dosing unit based on the received nutrient information, the received set of desired parameters and the generated set of nutrients recommendations by using the nutrient management based AI model, wherein the dosing unit injects the one or more additional nutrients in the water-based solution based on the determined set of dosing parameters; and
outputting, by the one or more hardware processors, the received nutrient information, the received set of desired parameters, the generated set of nutrients recommendation and the determined set of dosing parameters on user interface screen of one or more electronic devices associated with the one or more users.

12. The AI based method of claim 11, wherein the set of primary nutrients comprise: Nitrogen (N), Potassium (K) and Phosphorus (P), wherein the set of secondary nutrients comprise: Calcium (Ca), Magnesium (Mg) and Sulphur (S), and wherein the set of micro-nutrients comprise: Iron (Fe), Manganese (Mn), Cobalt (Co), Boron (B), Molybdenum (Mo), Nickel (Ni), Copper (Cu), Zinc (Zn) and Chloride (Cl).

13. The AI based method of claim 11, wherein the data measurement unit comprises: a set of Ion-Selective Electrodes (ISEs), an Electrical Conductivity (EC) probe, a data acquisition unit, an injection unit, one or more nutrient reservoirs, an in-line probe assembly, a water inlet, a water outlet, one or more pumps and a pH probe.

14. The AI based method of claim 11, wherein the one or more environment parameters comprise: Carbon dioxide ($CO_2$) level, ambient temperature, ambient humidity, potassium, nitrate, EC, pH and water temperature, wherein the one or more light parameters comprise: light intensity, wavelength and PPFD (Photosynthetic Photon Flux Density) in crop zone.

15. The AI based method of claim 11, wherein the set of dosing parameters comprise: number of times, durations of injecting the one or more additional nutrients in the water-based solution and quantity of each of the one or more additional nutrients required in the water-based solution.

16. The AI based method of claim 11, wherein generating the set of nutrients recommendations corresponding to one or more additional nutrients required in the water-based solution for maximum crop yield based on the received nutrient information, the received set of desired parameters, the predefined nutrient information and the historical crop data by using the nutrient management based AI model comprises:
correlating the received nutrient information, the received set of desired parameters, the predefined nutrient information and the historical crop data by using the nutrient management based AI model; and
generating the set of nutrients recommendations based on result of the correlation by using the nutrient management based AI model.

17. The AI based method of claim 11, further comprises:
detecting the one or more environment parameters and the one or more light parameters by using the plurality of IOT sensors;
determining one or more optimal environment conditions for the crops based on the detected one or more environment parameters, the growth conditions of the crops, the crop varieties and the developmental stage of the crops by using a growth management based AI model, wherein the one or more optimal environment conditions comprise: maintaining optimum levels of $CO_2$, temperature, nutrient concentrations and humidity in real-time;
determining one or more optimal light conditions for the crops based on the detected one or more light parameters, the growth conditions of the crops, the crop varieties and the developmental stage of the crops by using a growth management based AI model, wherein the one or more optimal light conditions comprise: controlling dynamic wavelength and intensity to optimize amount of light required for optimal growth of crops; and
performing one or more actions to achieve the determined one or more optimal environment conditions and the determined one or more optimal light conditions.

18. The AI based method of claim 11, further comprises:
retrieving the historical crop data associated with one or more farms where the crops are sown, from a storage unit, wherein the historical crop data comprise: previous crop yield in the one or more farms, nutrients available in at least one of: water and soil of the one or more farms, pH of the water, potassium, nitrate, EC, water temperature, ambient temperature, ambient humidity, $CO_2$ levels and light intensity in the one or more farms; and
generating one or more farm recommendations to improve production of crop in the one or more farms based on the historical crop data and predefined crop information by using a crop management based AI model, wherein the one or more farm recommendations comprise: injecting nutrients in the water-based solution, changing pH of the water-based solution, one of: increasing and decreasing water temperature, one of: increasing and decreasing ambient temperature, controlling ambient humidity, maintaining CO2 levels and one of: increasing and decreasing light intensity.

19. The AI based method of claim 11, further comprises:
receiving one or more inputs from a set of sensors for calibrating a set of ISEs, wherein the one or more inputs comprise: ion type, temperature, flow rate and probe runtime since initial calibration of the set of ISEs;
predicting delta y-intercept by performing data fusion on the received one or more inputs by using an automated calibration based Multilayer perceptron (MLP) artificial neural network, wherein the delta y-intercept is delta between ISE calibration line's initial y-intercept and drifted y-intercept;
determining drift corrected ISE measurement voltage based on measured ISE voltage, initial calibration values and the predicted delta y-intercept by using the automated calibration based MLP artificial neural network; and
calibrating the set of ISEs based on the determined drift corrected ISE measurement voltage by using the automated calibration based MLP artificial neural network.

20. The AI based method as claimed in claim 11, further comprises:
receiving one or more physiological symptoms associated with the crops from one or more electronic devices, wherein the one or more physiological symptoms comprise: number of leaves, root mass and harvest weight associated with the crops;
predicting one or more deficiencies in the crops based on the received one or more physiological symptoms and predefined deficiency information by using a deficiency management based AI model, wherein the one or more one or more deficiencies comprise: one or more deficient nutrients and chlorophyll deficiency; and
determining one or more deficiency causes responsible for the one or more deficiencies in the crops based on the received one or more physiological symptoms, the predefined deficiency information and the predicted one or more deficiencies by using the deficiency management based AI model, wherein the one or more deficiency causes comprise: deviation from optimal nutrient concentration per type, hazardous pH level of the water based solution, change in CO2, ambient temperature and ambient humidity, rate of nutrient uptake per type, deviation of nutrient ratio from optimal nutrient ratio and change in pH and wherein the predicted one or more deficiencies and the determined one or more deficiency causes are outputted on user interface screen of the one or more electronic devices associated with the one or more users.

* * * * *